(12) United States Patent
Ichikawa

(10) Patent No.: US 7,503,957 B2
(45) Date of Patent: Mar. 17, 2009

(54) HONEYCOMB STRUCTURE, METHOD OF MANUFACTURING THE SAME, DIE FOR FORMING, AND DISCHARGE FLUID PURIFICATION SYSTEM

(75) Inventor: Yukihito Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/892,286

(22) Filed: Aug. 21, 2007

(65) Prior Publication Data

US 2008/0000829 A1   Jan. 3, 2008

Related U.S. Application Data

(63) Continuation of application No. 10/816,851, filed on Apr. 5, 2004, now Pat. No. 7,276,101.

(30) Foreign Application Priority Data

Apr. 21, 2003  (JP) .............................. 2003-116016

(51) Int. Cl.
  *B01D 46/00*  (2006.01)
  *F01N 3/022*  (2006.01)
(52) U.S. Cl. .................. 55/523; 55/282.2; 55/282.3; 55/385.3; 55/524; 55/DIG. 5; 55/DIG. 10; 55/DIG. 30; 60/297; 60/299; 60/311; 428/116; 422/180; 502/439
(58) Field of Classification Search ............ 55/282.2, 55/282.3, 385.3, 523, 524, DIG. 5, DIG. 10, 55/DIG. 30; 60/297, 299, 311; 428/116, 428/117, 118; 422/177, 179, 180; 502/439
See application file for complete search history.

(56) References Cited

U.S. PATENT DOCUMENTS

| | | | |
|---|---|---|---|
| 5,494,881 A | 2/1996 | Machida et al. | |
| 6,343,923 B1 | 2/2002 | Cunningham et al. | |
| 6,800,107 B2 | 10/2004 | Ishihara et al. | |
| 7,204,965 B2 * | 4/2007 | Okawara et al. | ............... 55/523 |
| 7,276,101 B2 * | 10/2007 | Ichikawa | ..................... 55/523 |
| 2003/0140608 A1 | 7/2003 | Hamanaka et al. | |
| 2004/0166035 A1 | 8/2004 | Noda et al. | |
| 2004/0206062 A1 | 10/2004 | Ichikawa | |

FOREIGN PATENT DOCUMENTS

| | | | |
|---|---|---|---|
| EP | 0 250 166 A1 | | 6/1987 |
| EP | 0 307 073 A1 | | 7/1988 |
| EP | 1 153 643 A1 * | | 11/2001 |
| EP | 1 413 356 A1 | | 4/2004 |
| JP | A 57-7217 | | 1/1982 |
| JP | A-07-039760 | | 2/1995 |
| JP | A 9-290413 | | 11/1997 |

(Continued)

*Primary Examiner*—Jason M Greene
(74) *Attorney, Agent, or Firm*—Oliff & Berridge, PLC

(57) ABSTRACT

A honeycomb structure includes partition walls arranged in an X-direction and intersecting partition walls so as to form a plurality of cells extending to an other-end portion from a one-end portion through an axial direction. There are disclosed a honeycomb structure in which intersecting portions of the partition walls include an intersecting portion (lacking portion) lacking in the one-end portion, a method of manufacturing the honeycomb structure, and a discharge fluid purification system comprising the honeycomb structure. The honeycomb structure is able to inhibit the opening from being blocked and is easily manufactured.

12 Claims, 20 Drawing Sheets

FOREIGN PATENT DOCUMENTS

| | | |
|---|---|---|
| JP | A-2000-301516 | 10/2000 |
| JP | A-2002-273124 | 9/2002 |
| JP | A 2002-309922 | 10/2002 |
| JP | A-2003-033664 | 2/2003 |
| WO | WO 99/48597 | 9/1999 |

* cited by examiner

HONEYCOMB STRUCTURE, METHOD OF MANUFACTURING THE SAME, DIE FOR FORMING, AND DISCHARGE FLUID PURIFICATION SYSTEM

This is a Continuation of application Ser. No. 10/816,851 filed Apr. 5, 2004, issued as U.S. Pat. No. 7,276,101 on Oct. 2, 2007. The entire disclosure of the prior application is hereby incorporated by reference herein in its entirety.

BACKGROUND OF THE INVENTION

1. Field of the Invention

The present invention relates to a honeycomb structure, a method of manufacturing the honeycomb structure, a die for forming, and a discharge fluid purification system, particularly to a honeycomb structure preferably usable for exhaust gas purification, water treatment, separating films and the like, a method of manufacturing the honeycomb structure, a die for forming, preferably usable in the manufacturing method, and a discharge fluid purification system in which the honeycomb structure is used.

2. Description of the Related Art

There has been increasingly a need for removing particulates and toxic materials from an exhaust gas of an internal combustion engine, boiler or the like in consideration of an influence on an environment. Especially, regulations on removal of particulate materials (hereinafter referred to as PM) exhausted from diesel engines have tended to be reinforced in Europe, America, and Japan, and a honeycomb filter in which a honeycomb structure is used has been used in a trapping filter (hereinafter referred to as DPF) for removing the PM. The honeycomb filter in which the honeycomb structure is used has also been used in filtration of liquids such as city water and sewage or in the separating films and the like.

When the honeycomb structure is used as the honeycomb filter, for example, as shown in FIGS. 16(a) to (c), the honeycomb structure is used in the form of a honeycomb structure 1 comprising porous partition walls 2 arranged so as to form a plurality of cells 3 extending to an other-end portion 44 from a one-end portion 42 through an axial direction, and plugging portions 4 arranged so as to plug the cells 3 in either end portion. In this form, a fluid to be treated flowing into the cell from the one-end portion 42 is discharged from the other-end portion 44 via another cell 3 through the porous partition wall 2. In this case, the partition wall 2 forms a filter to capture the PM and the like.

However, when the honeycomb structure is used as the DPF or the like, and many deposits such as the PM 9 are deposited on an open end portion of the cell, there are problems that an inflow area of the open end portion decreases or the open end portion is blocked, a pressure loss of the honeycomb filter increases, and an output drop or deterioration of fuel efficiency of the diesel engine is caused.

Moreover, a honeycomb structure which does not have any plugging portion is also used, for example, in removing soluble organic components (hereinafter referred to as SOF) discharged from the diesel engine, but there are problems that the SOF and the like stick to the open end portion, the inflow area of the open end portion decreases, or the open end portion is blocked to increase the pressure loss. Furthermore, this problem of the blocked opening is caused not only in a case where the exhaust gas from the diesel engine is treated but also in a case where gas or liquid is treated as the fluid to be treated.

In a case where the honeycomb structure including the plugging portion is used for the DPF, as a method of preventing a rapid increase of the pressure loss by the deposition of the particulate material, a plugging honeycomb structure has been proposed in which a protruding portion protruding in a shape thinned toward an upstream side from the end portion of the cell is formed in the plugging portion (see Japanese Patent Application Laid-Open No. 2002-309922). However, an appropriate manufacturing method capable of providing the honeycomb structure including the plugging portion shaped in this manner as an industrial product has not been described, and there is not any method capable of industrially manufacturing the structure.

Moreover, a structure whose partition walls are deformed/bent and bonded to each other to close a port of the cell passage in a tip of a square cell passage (see Japanese Patent Application Laid-Open No. 57-7217). Even this structure has an effect of inhibiting the blocking, but it is difficult to form a deformed/bent portion. There has been a demand for a structure in which strength of the deformed/bent portion is further enhanced.

SUMMARY OF THE INVENTION

An object of the present invention is to provide a honeycomb structure whose opening is inhibited from being blocked and which is easily manufactured, a method of manufacturing the honeycomb structure, and a discharge fluid purification system in which the honeycomb structure is used.

According to a first aspect of the present invention, there is provided a honeycomb structure comprising: partition walls arranged in an X-direction so as to form a plurality of cells extending to an other-end portion from a one-end portion through an axial direction; and partition walls intersecting with the partition walls, wherein intersecting portions of the partition walls include a lacking intersecting portion in the one-end portion.

The honeycomb structure of the first aspect preferably includes an intersecting portion in which an axial-direction depth of lack of the partition wall intersecting portion is 10% or more of a cell pitch, and the intersecting portions of the partition walls also preferably include a lacking intersecting portion in the other-end portion. The intersecting portion of the partition wall preferably includes a portion lacking to the other-end portion from the one-end portion. The honeycomb structure also preferably comprises: plugging portions for plugging open end portions of predetermined cells among a plurality of cells in either end portion, and some of the plugging portions further preferably include plugging portions lacking together with the surrounding intersecting portions.

The honeycomb structure also preferably comprises: intersecting portions which are lacking around the plugging portion and in which the axial-direction depth of the lack is smaller than that of the plugging portion, and further preferably comprises: intersecting portions which are lacking around the plugging portion and in which the axial-direction depth of the lack is larger than that of the plugging portion. The plugging portion also preferably includes a portion whose width is reduced toward an endmost portion from a cell side. A catalyst component is preferably carried by the surface of the plugging portion, and also the partition wall preferably comprises pores and is porous, and the surface of the partition wall and/or the pore surface inside the partition wall carries the catalyst component.

According to a second aspect of the present invention, there is provided a discharge fluid purification system comprising: a purification section for purifying a discharge fluid; and an introductory section for introducing the discharge fluid into the purification section, wherein the purification section comprises the honeycomb structure, and a one-end portion of the honeycomb structure is disposed on an upstream side.

According to a third aspect of the present invention, there is provided a method of manufacturing a honeycomb structure, comprising: a processing/removing step of cutting intersecting portions of partition walls in a one-end portion of a honeycomb body comprising the partition walls arranged so as to form a plurality of cells extending to an other-end portion from the one-end portion through an axial direction and partition walls intersecting with the partition walls.

In the third aspect, the processing/removing step preferably comprises: a step of processing/removing the intersecting portions of the partition walls so as to make holes in an end surface, and the processing/removing step also preferably comprises: a step of processing/removing the end surface along a line connecting the intersecting portion to another intersecting portion of the partition walls. The method preferably comprises: a plugging step of plugging open end portions of the cells. In this case, the processing/removing step is preferably performed after the plugging step, and the plugging step is also preferably performed after the processing/removing step. The honeycomb body is preferably a fired body, and the honeycomb body is also preferably a non-fired formed body, and a firing step is also preferably included after the processing/removing step. As the processing/removing method, a grinding/processing method in which a grindstone is used, and a cutting/processing method in which an end mill or bite or the like is used are preferable, but the present invention is not especially limited to these methods. Examples of the processing method may include charging processing, ultrasonic processing, beam processing by laser light and the like.

According to a fourth aspect of the present invention, there is provided a method of manufacturing a honeycomb structure, comprising: a forming step of extruding a forming raw material to form a formed body of the honeycomb structure comprising partition walls arranged in an X-direction so as to form a plurality of cells extending to an other-end portion from a one-end portion through a axial direction and partition walls intersecting with the partition walls, wherein the forming step comprises: a step of forming the formed body in such a manner that at least some of intersecting portions of the partition walls are lacking to the other-end portion from the one-end portion. In the forming step of the fourth aspect, the forming raw material is preferably extruded by use of a die including intersecting slits forming the partition walls arranged in the X-direction and the intersecting partition walls and including intersecting portions of the slits at least some of which are blocked. A preferable die for forming, for use in the forming step, comprises: a die base including at least two surfaces and comprising a raw material supply path which is opened in one of the surfaces and slits which communicate with the raw material supply path and which are opened in the other surface, wherein the slits preferably comprise: slits arranged in an X-direction; slits arranged in an intersecting direction; and intersecting portions in which the slits of the two directions intersect with one another in the other surface, and at least some of the intersecting portions are blocked.

BRIEF DESCRIPTION OF THE DRAWINGS

FIG. 13(c) is a sectional view, and FIG. 13(d) is a partial enlarged view of FIG. 13(a);

DESCRIPTION OF THE PREFERRED EMBODIMENT

A honeycomb structure, a method of manufacturing the honeycomb structure, and a discharge fluid purification system in which the honeycomb structure is used according to the present invention will be described hereinafter in detail based on a concrete embodiment, but the present invention is not limited to the following embodiment.

Figure 1:
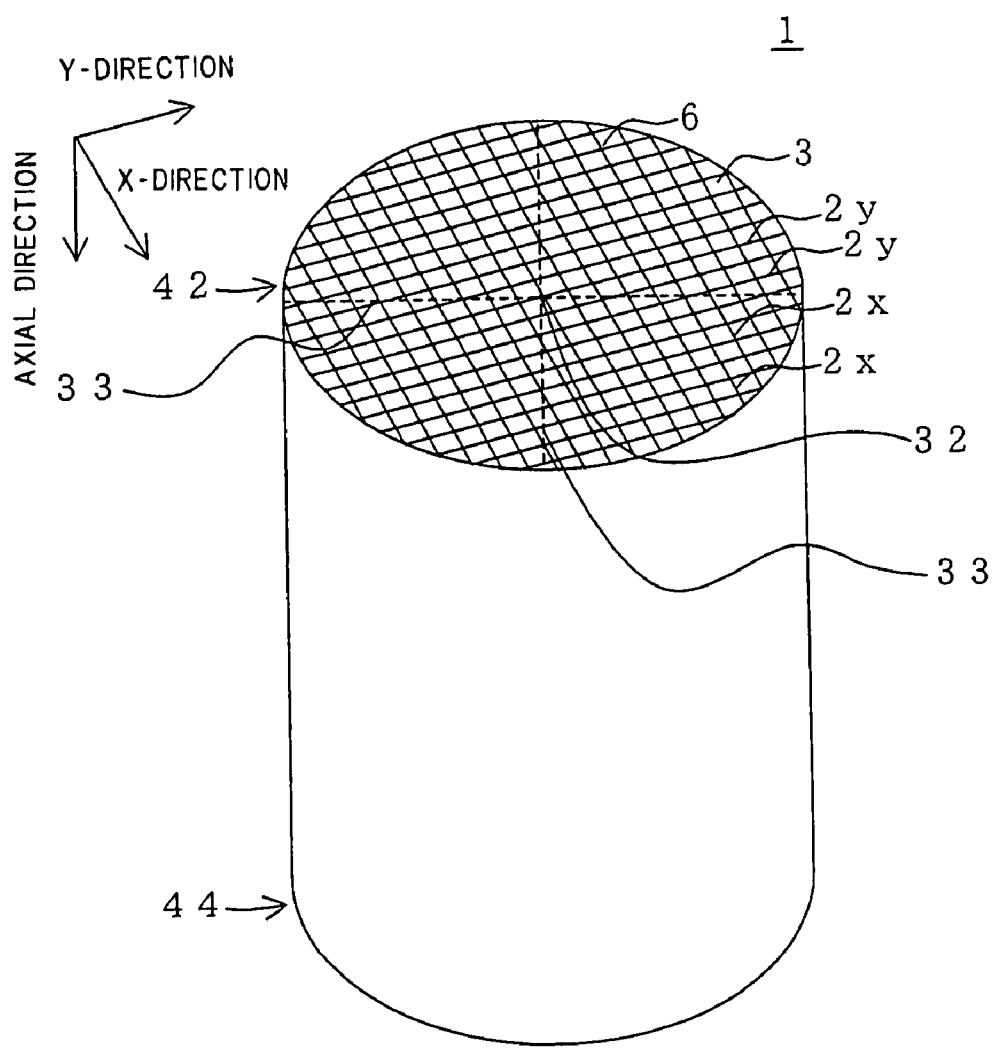
FIG. 1 is a schematic perspective view showing one mode of a honeycomb structure according to a first aspect of the present invention.
Figure 2A:
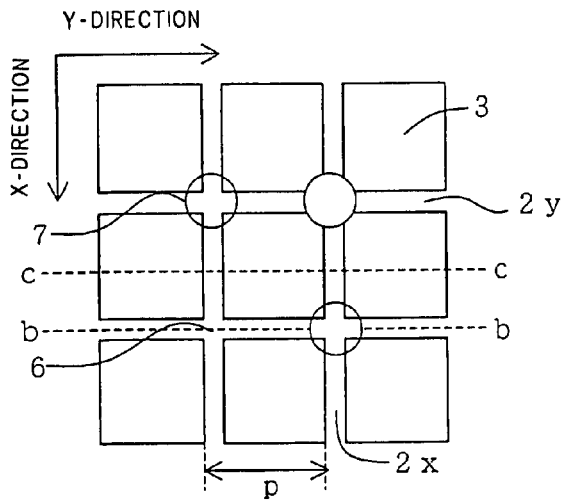
FIG. 2(a) is a schematic plane partial enlarged view showing one mode of the honeycomb structure according to the first aspect of the present invention.
Figure 2B:
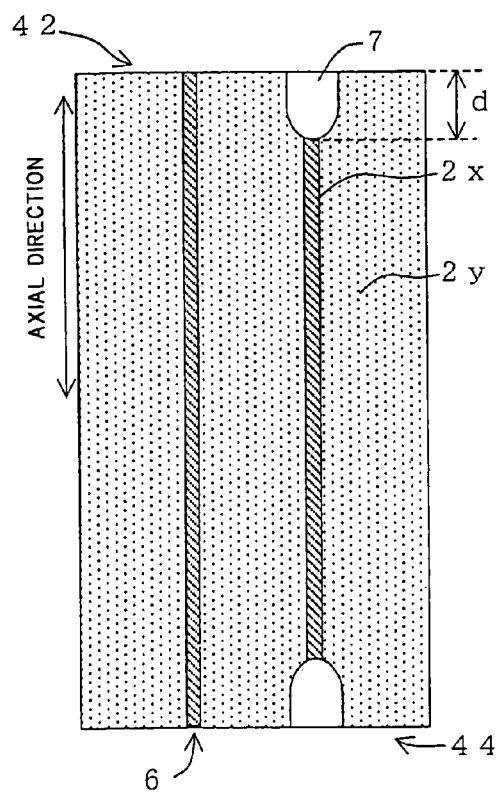
FIG. 2(b) is a b-b sectional view in FIG. 2(a)
Figure 2C:
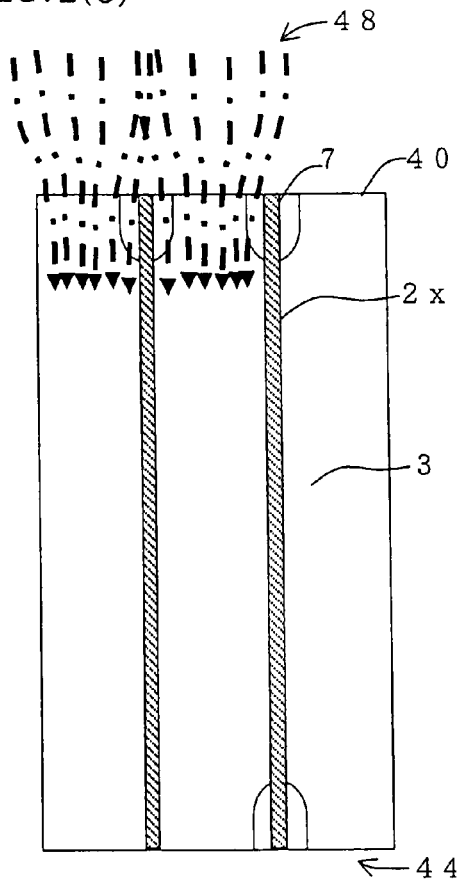
FIG. 2(c) is a c-c sectional view in (a)
Figure 17:
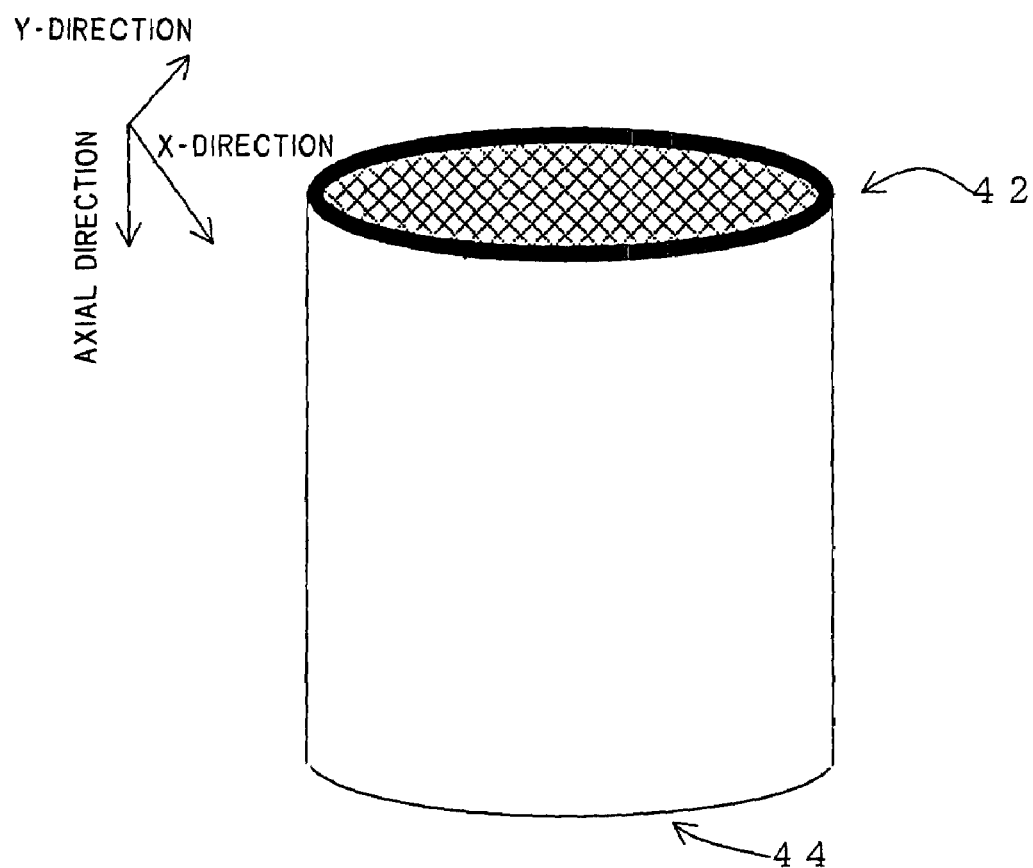
FIG. 17 is a schematic perspective view showing one example of the conventional honeycomb structure.
Figure 18A:
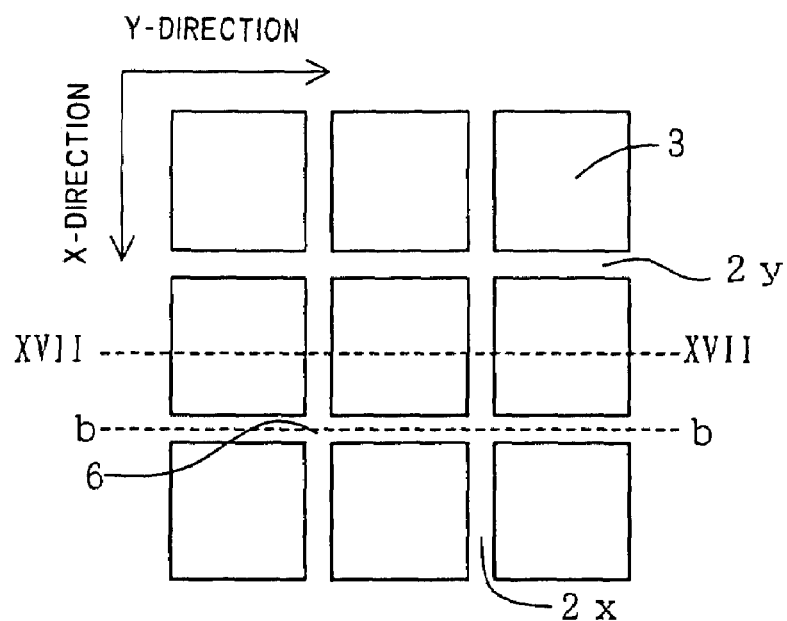
FIG. 18(a) is a plane partial enlarged view of FIG. 17.
Figure 18B:
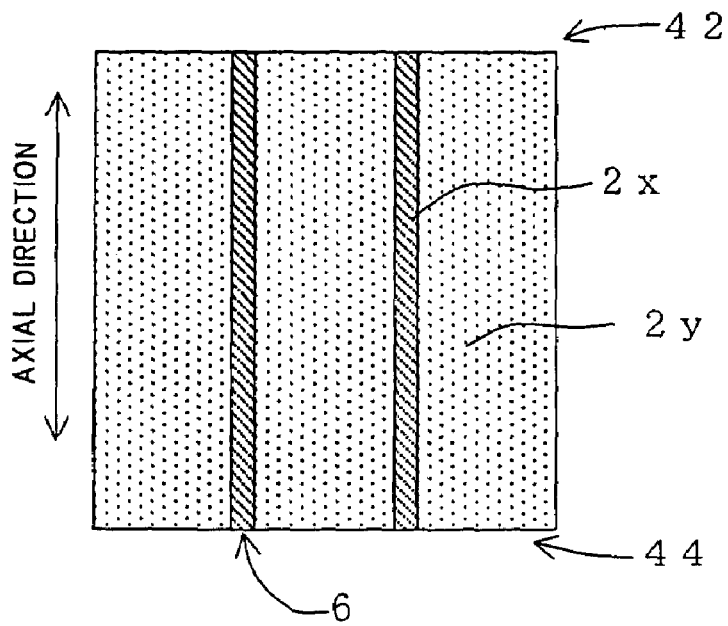
FIG. 18(b) is a section partial enlarged view.
Figure 19A:
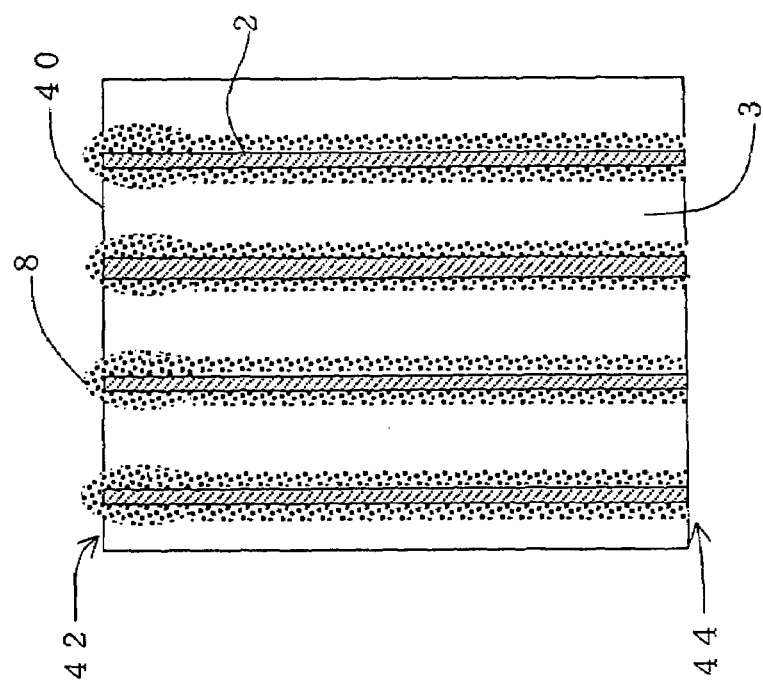
FIGS. 19(a), (b) are explanatory views showing a process in which the particulate material is deposited on the conventional honeycomb structure.
Figure 19B:
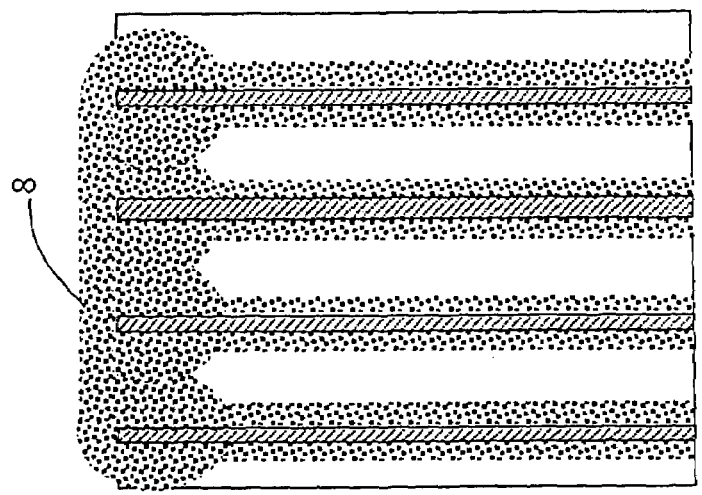

First, the concrete embodiment of the honeycomb structure of a first aspect will be described. As shown in FIG. 1, a honeycomb structure 1 of the first aspect includes partition walls 2x arranged in an X-direction so as to form a plurality of cells 3 extending to an other-end portion 44 from a one-end portion 42 through an axial direction, and intersecting partition walls, for example, 2y arranged in a Y-direction. For important characteristics in the first aspect, as shown in FIGS. 2(a), (b), intersecting portions 6 of the partition walls 2x, 2y include an intersecting portion including a lacking portion 7 lacking in the one-end portion. As shown in FIGS. 17, 18(a), (b), the intersecting portions 6 have not heretofore had any lacking portion. Therefore, as shown in FIG. 19(a), when a fluid to be treated 48 flows into the cell, an SOF 8 and the like are easily deposited in an inlet portion of the cell 3, that is, an open end portion 40. By bridging of deposits, as shown in FIG. 19(b), the open end portion 40 is sometimes blocked, and in many cases this bridging has occurred from the intersecting portion of the partition wall, which is a base point. However, in the honeycomb structure of the first aspect, as shown in FIGS. 2(a) to (c), since the intersecting portions 6 of the partition walls include the lacking portion 7 in the open end portion 40, the opening broadens, the fluid to be treated 48 in the open end portion 40 smoothly flows, and the deposition of the SOF 8 and the like is reduced. Furthermore, the intersecting portions 6 of the partition walls in the end portion are dented from the other portions of the partition walls in the axial direction. Therefore, even when the SOF and the like are deposited, the blocking by the bridging of the deposits from the intersecting portion that is the base point does not easily occur. Furthermore, since the structure can be manufactured by simple steps in a manufacturing method of third and fourth aspects described later, the structure can be manufactured at a low cost, and is easily mass-produced. Since the end portion of the partition wall does not have to be deformed/bent, a satisfactory strength can be maintained.

Furthermore, a crack by a thermal shock in the end portion can be inhibited from being developed. The crack by the thermal shock is easily generated in or in the vicinity of the end portion or in or in the vicinity of the partition wall intersecting portion, and the crack is easily developed so as to connect the intersecting portion to another intersecting portion. Therefore, when the intersecting portions of the partition walls are dented from the other portions of the partition walls in the end portion, the crack by stress concentration in the same plane can be inhibited from being developed. This phenomenon is also seen in an inlet end portion directly influenced by heat of exhaust gas in a three-way catalyst or an oxidation catalyst in which the honeycomb structure is used, and therefore the honeycomb structure of the first aspect is useful also in an application of this catalyst structure. Even when the intersecting portion exists in a part of the honeycomb structure, the effect of the present invention can be obtained, but 5% or more, further 10% or more, especially 20% or more of the intersecting portions are preferably arranged in this relation. Most preferably, all the intersecting portions include the lacking portions in an end surface. For the honeycomb structure including quadrangular cells, the thermal shock crack is easily generated in or in the vicinity of the partition wall intersecting portion in a diagonal direction or the cell, and the crack is easily developed so as to connect the intersecting portion to the other intersecting portion. Therefore, when the crack is developed so as to pass in the vicinity of a section middle part of the honeycomb structure, and crosses the honeycomb structure section, the honeycomb structure is entirely destroyed. Therefore, in order to prevent the crack from being developed to cross the section of the honeycomb structure, the partition walls having different heights in the axial direction in the end portion may appropriately be arranged in a region (the corresponding region can be determined by observation of a region where the crack is actually developed) which passes through a center point 32 of X and Y-axes shown in FIG. 1 (i.e., center of the honeycomb structure in the figure) and which centers on two lines 33 (lines of Y=X and Y=−X) in a 45° direction with respect to a longitudinal direction of the partition wall.

There are not any restrictions on an axial-direction depth of the lacking portion in the first aspect, but when the lacking portion is excessively shallow, the effect of the present invention is excessively small, and this is not favorable. The axial-direction depth of the lacking portion is preferably 10% or more, further preferably 30% or more, especially preferably 50% or more of the cell pitch of the cell adjacent to the lacking portion. Here, cell pitch means a width necessary for forming one cell, and refers to a length shown by p in FIG. 2(a). When a plurality of cell pitches exist per cell, a shortest cell pitch is a standard. The axial-direction depth of the lacking portion is a depth shown by d in FIG. 2(b), and means a height difference between an axial-direction deepest portion of the lacking portion and a most protruding portion in the axial direction of the partition wall.

Figure 3A:
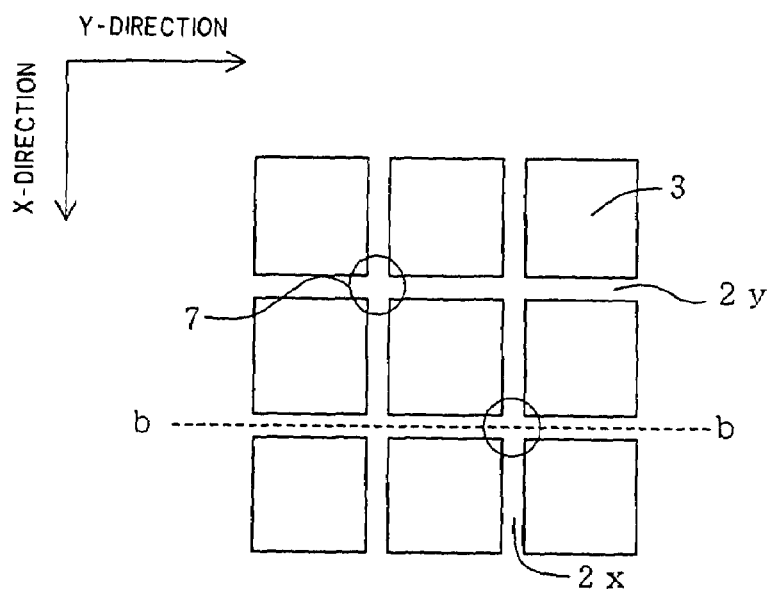
FIG. 3(a) is a schematic plane partial enlarged view showing another mode of the honeycomb structure according to the first aspect of the present invention.
Figure 3B:
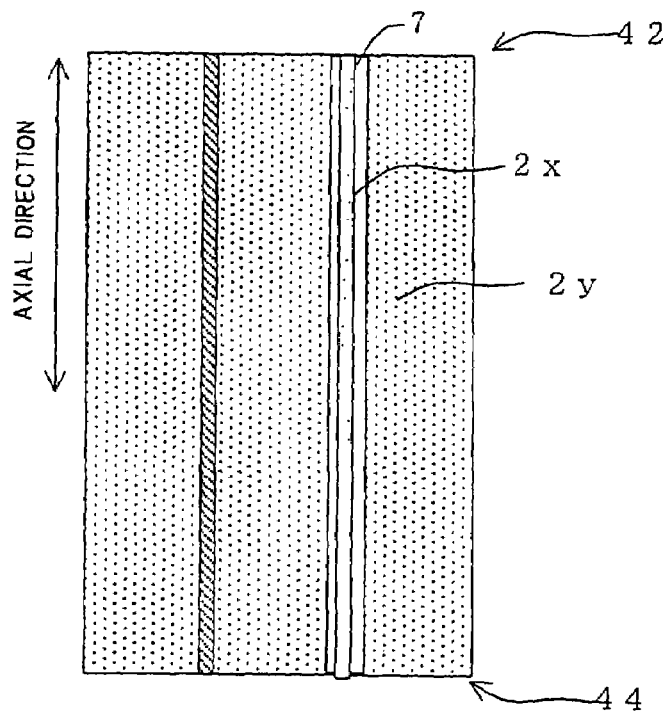
FIG. 3(b) is a b-b sectional view in FIG. 3(a)

Moreover, as shown in FIGS. 3(a), (b), the honeycomb structure of the first aspect preferably includes a portion in which the intersecting portion of the partition wall is lacking to the other-end portion 44 from the one-end portion 42. Even in this mode, as described above, the cell can be effectively inhibited from being blocked, and the effect of the first aspect can be obtained even in the other end surface. A mode in which the lacking portion 7 having a predetermined depth as shown in FIG. 2(b) is mixed with the lacking portion 7 extending through the axial direction as shown in FIG. 3(b) is also a preferable mode. As shown in FIG. 2(b), the intersecting portion including the lacking portion 7 is also preferably included in the other-end portion 44 as shown in FIG. 2(b) in that the crack by the thermal shock is inhibited from being developed and the fluid to be treated smoothly flows.

Figure 4:
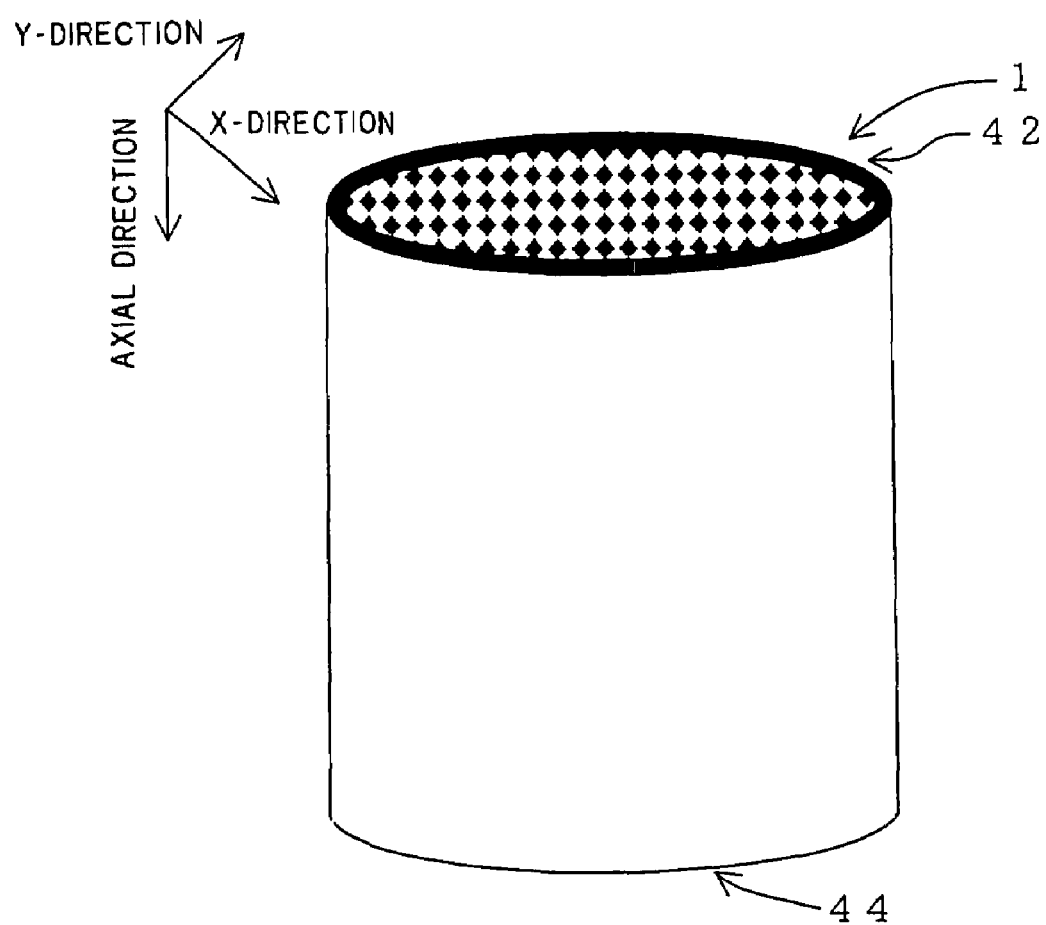
FIG. 4 is a schematic perspective view showing another mode of the honeycomb structure according to the first aspect of the present invention.
Figure 5A:
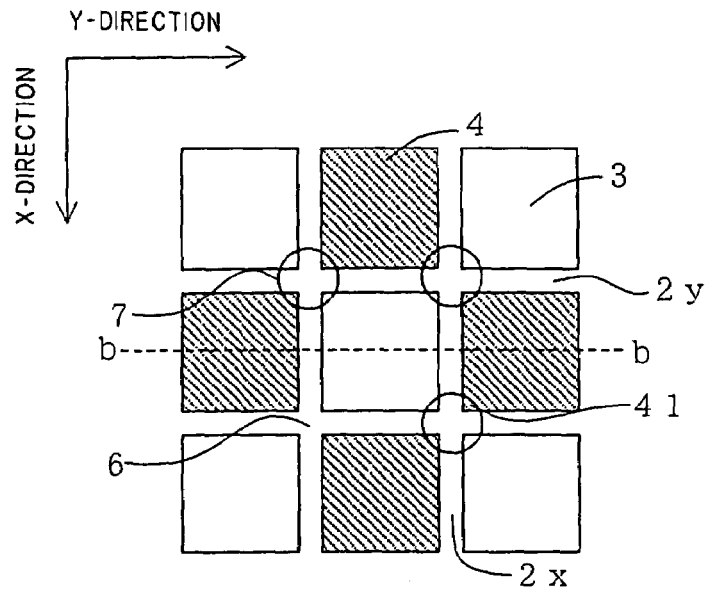
FIG. 5(a) is a schematic plane partial enlarged view showing another mode of the honeycomb structure according to the first aspect of the present invention.
Figure 6A:
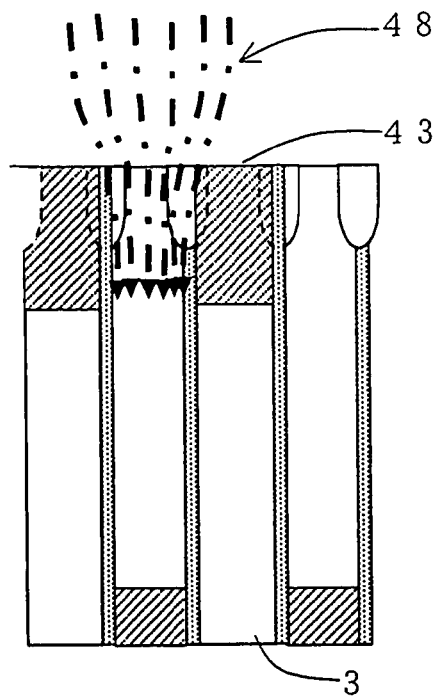
FIGS. 6(a) to (c) are explanatory views showing a process in which a fluid to be treated flows into the honeycomb structure according to the first aspect of the present invention, and a particulate material is deposited.
Figure 6B:
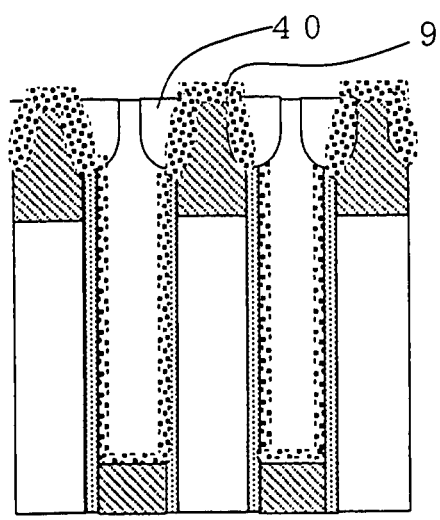
Figure 20A:
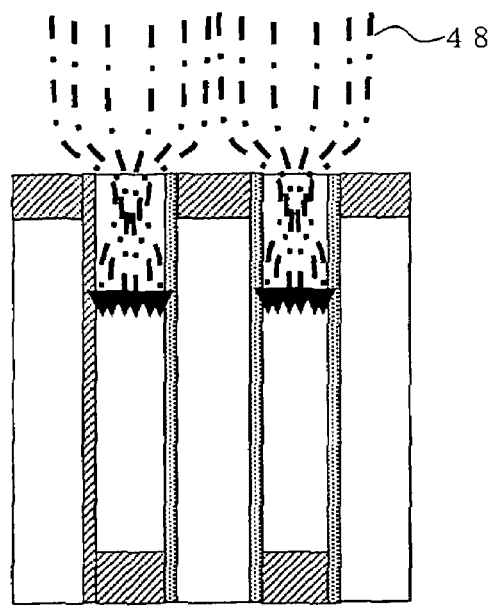
FIGS. 20(a) to (c) are explanatory views showing a process in which the particulate material flows in and is deposited on the conventional honeycomb structure.
Figure 20B:
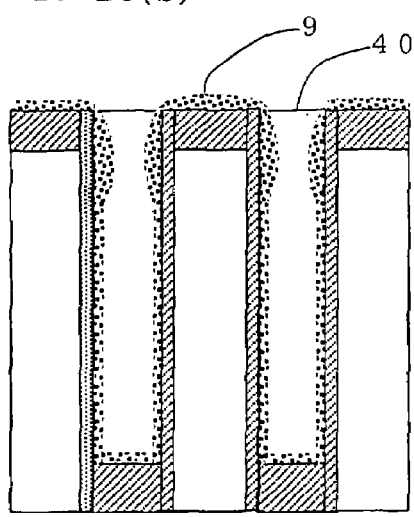
Figure 20C:
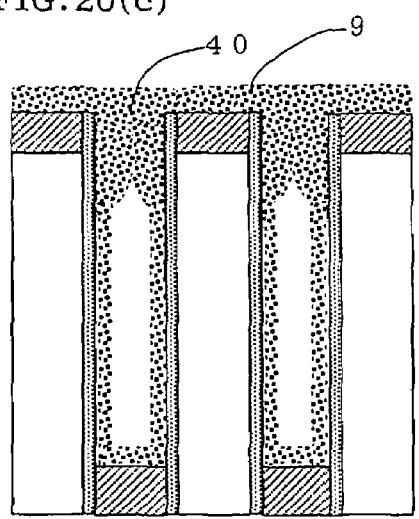

As shown in FIGS. 4, 5(a), (b), the honeycomb structure of the first aspect includes plugging portions 4 for plugging an open end portion of a predetermined cell among a plurality of cells 3 in either end portion, and this is preferable in a case where the structure is used as the filter such as DPF. In this mode, a part of the plugging portion 4 is preferably lacking together with the surrounding intersecting portions 6. When the conventional honeycomb structure including the plugging portion is used as the filter such as the DPF, as shown in FIG. 20(a), stagnation of flow of a fluid occurs in the vicinity of the open end portion. As shown in FIG. 20(b), a PM 9 and the like are deposited in the vicinity of the open end portion 40, and as shown in FIG. 20(c), the open end portion 40 is sometimes blocked by the bridging of the PM 9 and the like. Furthermore, the bridging occurs from the partition wall intersecting portion in the end portion, which is the base point, in many cases. Therefore, as shown in FIGS. 5(a), (b), when the partition wall intersecting portion 6 is lacking together with the plugging portion 4 in the end portion, a corner 41 of the partition wall intersecting portion 6 and plugging portion 4 is dented in the axial direction. As shown in FIG. 6(a), the fluid to be treated 48 smoothly flows, and the blocking by the bridging in the open end portion is not easily caused as shown in FIGS. 6(b), (c).

Moreover, in this mode, a thermal stress in the end portion can be distributed, and the crack can be inhibited from being generated or developed by concentration of the thermal stress. In the honeycomb structure including the plugging portion, the cell including the plugging portion is higher in rigidity than the cell which does not have any plugging portion, and the thermal stress is easily concentrated on the intersecting portion of the partition walls from this difference of rigidity. However, in the above-described mode, the surface appearing because of the lack of the corner 41 is brought into a state in which there is not any partition wall around the surface. Therefore, the rigidity lowers, resistance to the thermal stress is enhanced, the difference of rigidity is reduced, and accordingly the stress concentration is inhibited. From the viewpoint of the reduction of the crack, even in the honeycomb structure including the plugging portion, as shown in FIG. 5(b), the lacking portion 7 of the partition wall intersecting portion preferably exists in the other-end surface 44.

Figure 5B:
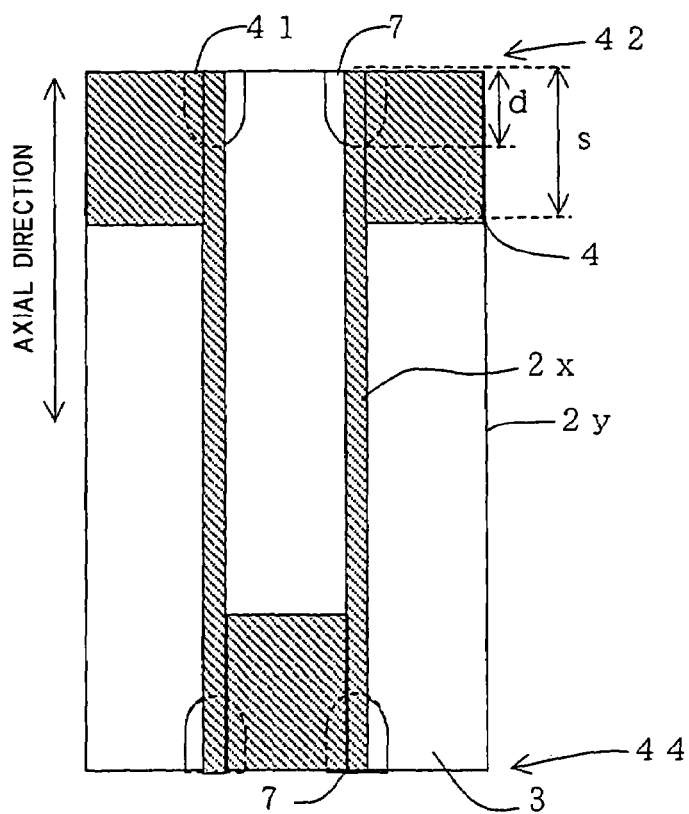
FIG. 5(b) is a b-b sectional view in FIG. 5(a)
Figure 7:
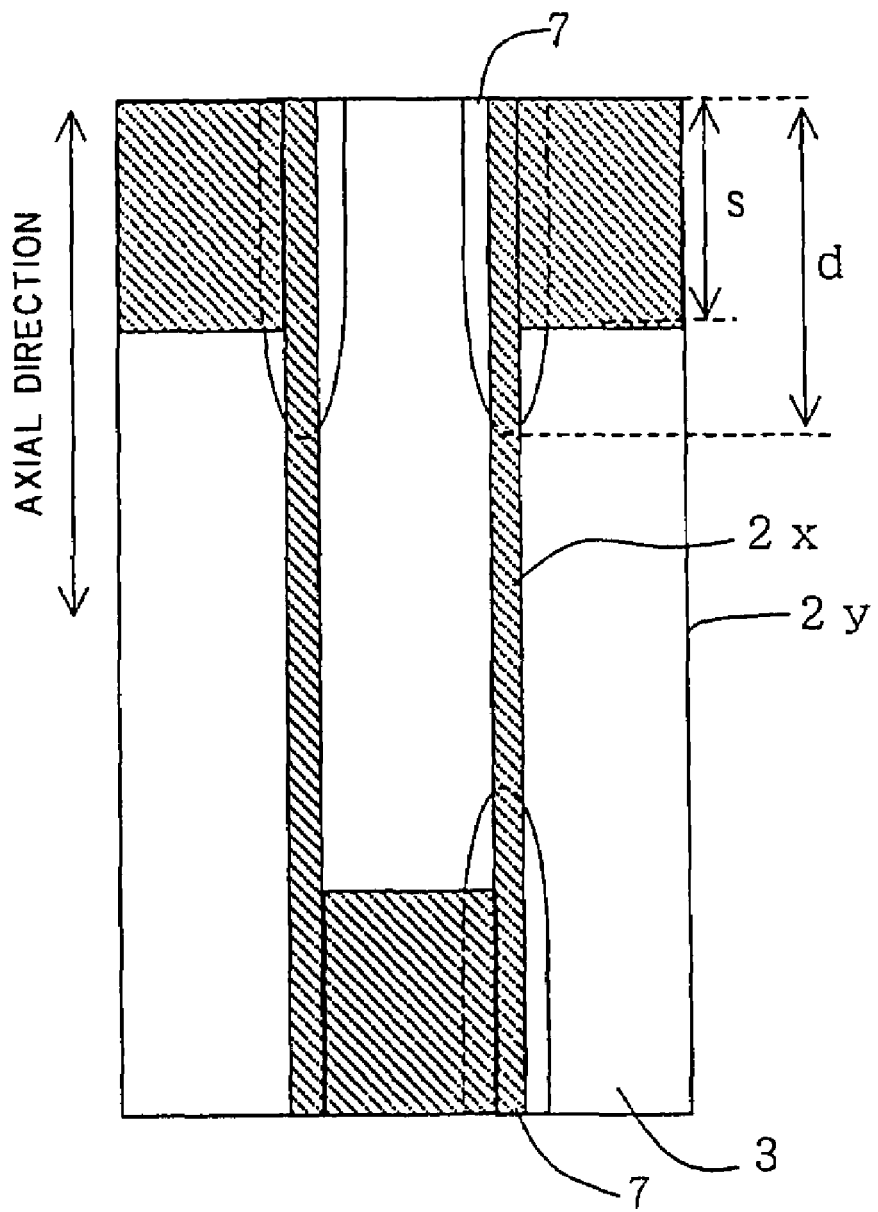
FIG. 7 is a schematic sectional view showing another mode of the honeycomb structure according to the first aspect of the present invention.

When the honeycomb structure includes the plugging portion, and the intersecting portion of the surrounding partition wall includes the lacking portion, as shown in FIG. 5(b), a depth d of the lacking portion in the axial direction is preferably smaller than an axial-direction depth s of the plugging portion. However, as shown in FIG. 7, the depth d of the lacking portion in the axial direction is larger than the axial-direction depth s of the plugging portion, and this is also preferable in a case where the reduction of the pressure loss is regarded as more important than a capturing efficiency. The lacking portions of these two modes are preferably mixed. As shown in FIG. 7, the lacking portion whose depth d in the axial direction is larger than the axial-direction depth s of the plugging portion is preferably disposed in the other end surface in order to reduce the pressure loss.

As shown in FIG. 6(a), the plugging portions 4 preferably include a portion whose width is reduced toward an endmost portion 43 from the cell 3 side, that is, a tapered shape. In this case, as shown in FIG. 6(a), the fluid to be treated 48 flows into the cell 3 along the shape of the tapered plugging portion, the stagnation of the flow of the fluid to be treated 48 is further inhibited in the cell inlet, an inflow resistance of the exhaust gas decreases, and the blocking is further inhibited as shown in FIGS. 6(b), (c).

In the honeycomb structure of the first aspect, catalysts such as a metal having a catalytic ability are preferably carried. For example, when the structure is used as the DPF or in removing the SOF, catalysts capable of removing the captured materials, such as a catalyst capable of promoting oxidation/combustion of the PM, are preferably included in order to remove the SOF or the PM such as soot captured in the honeycomb structure. Concrete examples of the catalyst include noble metals such as Pt, Pd, and Rh, a nonmetallic perovskite catalyst and the like, and at least one type is preferably carried by the honeycomb structure. This catalyst is preferably carried by the surface of the partition wall, but it is also preferable to use a porous partition wall and to carry the catalyst inside pores. In the honeycomb structure including the plugging portion, it is also preferable to carry the catalyst on the surface of the plugging portion, that is, the surface exposed to the outside of the honeycomb structure. In this case, the materials such as the PM attached/deposited onto the surface of the plugging portion cause the blocking of the open end portion, and therefore the materials can be removed to inhibit the blocking.

For the honeycomb structure in the present invention, there are not any special restrictions on the shape. A sectional shape of the honeycomb structure can be appropriately determined, for example, as a circular shape, elliptic shape, race track shape, quadrangular shape or the like in accordance with application or installation place. There is not any special restriction on the sectional shape of the cell as long as the partition walls intersect with each other, but a triangular, quadrangular, or hexagonal sectional shape can be formed. However, in honeycomb structure characteristics and manufacturing properties, the quadrangular shape is preferable in balance, the rectangular shape is further preferable, and the square shape is especially preferable. The triangular cell is preferable for a partition wall surface area. Therefore, the triangular cell is preferably for the pressure loss in a case where the PM is deposited on the DPF. In consideration of the resistance to thermal shock, the triangular cell, and further the hexagonal cell are preferable.

There are not any special restrictions on a cell density, but the cell density may be set, for example, to 6 to 2000 cells/square inch (0.9 to 311 cells/cm$^2$), preferably about 50 to 1000 cells/square inch (7.8 to 155 cells/cm$^2$). There are not any special restrictions on the thickness of the partition wall, but the thickness may be set, for example, to 30 to 2000 μm, preferably 40 to 1000 μm, further preferably about 50 to 750 μm. Moreover, when the plugging portion is disposed, the cells adjacent to each other via the partition wall include the plugging portions in the end portions on the opposite sides, and the plugging portions are preferably arranged so that each end portion has a checkered pattern.

For the honeycomb structure of the present invention, the partition wall is preferably porous. In this case, there are not any special restrictions on a porosity of the partition wall 2. However, for example, when the honeycomb structure 1 is used in the DPF, the porosity is preferably 20% or more, more preferably 40% or more, further preferably 60% or more. The thickness of the partition wall 2 is appropriately reduced, the cell density is decreased, that is, a water power diameter of a cell passage is increased, and the porosity is raised. This is also a preferable mode from a viewpoint of reduction of an initial pressure loss. For example, the thickness of the partition wall 2 is 1.5 mm or less, more preferably 1 mm or less, further preferably 0.5 mm or less. The cell density is 300 cells/square inch or less, more preferably 200 cells/square inch or less, further preferably 100 cells/square inch or less. The porosity is 50% or more, more preferably 60% or more, further preferably 70% or more. On the other hand, when the porosity is excessively large, a strength is excessively insufficient, and therefore the porosity is preferably 90% or less. The thickness of the partition wall 2 is further reduced to lower the porosity, and this is a preferable mode from viewpoints of the reduction of the initial pressure loss while securing a thermal resistance and strength of the partition wall. For example, the thickness of the partition wall 2 is 0.4 mm or less, more preferably 0.3 mm or less, further preferably 0.2 mm or less. The porosity is 60% or less, more preferably 50% or less, further preferably 40% or less.

Furthermore, the honeycomb structure 1 is used as filters which have to reduce the pressure loss, such as a filter in which the catalyst is carried and particulates are continuously burnt. In this case, the porosity is in a range of preferably 30 to 90%, further preferably 50 to 80%, especially preferably 50 to 75%. Moreover, the honeycomb structure is used as a filter in which the catalyst for promoting combustion of the particulate material in the exhaust gas is carried by the partition walls 2. In this case, the structure needs to be formed of a dense material having a high strength so as to bear a larger thermal stress generated at a combustion time of the particulate material. The porosity of this material is preferably 20 to 80%, further preferably 25 to 70%, especially preferably 30 to 60%. For the preferable porosity in a case where there is not any plugging, even when the structure is used in removing the SOF or used as an SCR catalyst, the porosity is in a similar range, and preferably high in order to hold the catalyst on the pore surface inside the partition wall and to increase the contact area with the exhaust gas. It is to be noted that the porosity means a volume %.

Moreover, when the honeycomb structure is used in the discharge fluid purification system, the honeycomb structure is stored and used in a can member formed of a metal or the like in many cases. In this case, edge portions of the opposite end portions of the honeycomb structure are sometimes fixed by a fixing member. In this case, the porosity of the plugging portion is set to be smaller than that of another portion of the plugged honeycomb structure, and the plugging portion is densified. Accordingly, the plugging portion develops a sufficient strength so as to be capable of bearing the contact with the fixing member, and also an effect of smoothing the surface of the plugging portion and reducing friction with the fixing member can be expected. In this case, it is also a preferable mode to reduce the porosity of the whole plugging portion. In another preferable mode, the porosity of the endmost portion in the plugging portion is reduced.

There are not any special restrictions on a pore diameter of the partition wall which is a porous member, and the diameter can be appropriately selected by any person skilled in the art in accordance with the application. In general, the pore diameter can be selected in accordance with viscosity of the fluid or an object to be separated. For example, when the honeycomb structure 1 is used in the DPF, the diameter is preferably set to about 1 to 100 μm on average. When the structure is used for purification of water, the diameter is preferably set to about 0.01 to 10 μm. For the preferable pore diameter in a case where there is not any plugging, even when the structure is used in removing the SOF or used as the SCR catalyst, the pore diameter is in the similar range. The pore diameter is preferably large in order to hold the catalyst on the pore surface inside the partition wall and to increase the contact area with the exhaust gas.

Moreover, there are not any special restrictions on the material of the honeycomb structure. From viewpoints of the strength, thermal resistance, durability and the like, main components are preferably various ceramics of oxide or non-oxide, metals and the like. Concretely, examples of the ceramic include cordierite, mullite, alumina, spinel, silicon carbide, silicon nitride, aluminum nitride, zirconia, lithium aluminum silicate, aluminum titanate and the like. Examples of the metal include an Fe—Cr—Al-based metal, metal silicon and the like. One or two or more selected from these are preferable main components. Examples of the preferable material of the partition wall 2 include adsorption materials such as activated carbon, silica gel, and zeolite. Furthermore, from the viewpoints of high strength and thermal resistance, one or two or more selected from a group consisting of alumina, mullite, zirconia, silicon carbide, and silicon nitride are preferable. From the viewpoints of thermal conductivity and thermal resistance, silicon carbide or a silicon-silicon carbide composite material is especially suitable. Here, the "main component" constitutes 50 mass % or more, preferably 70 mass % or more, further preferably 80 mass % or more of the partition walls 2.

Figure 8:
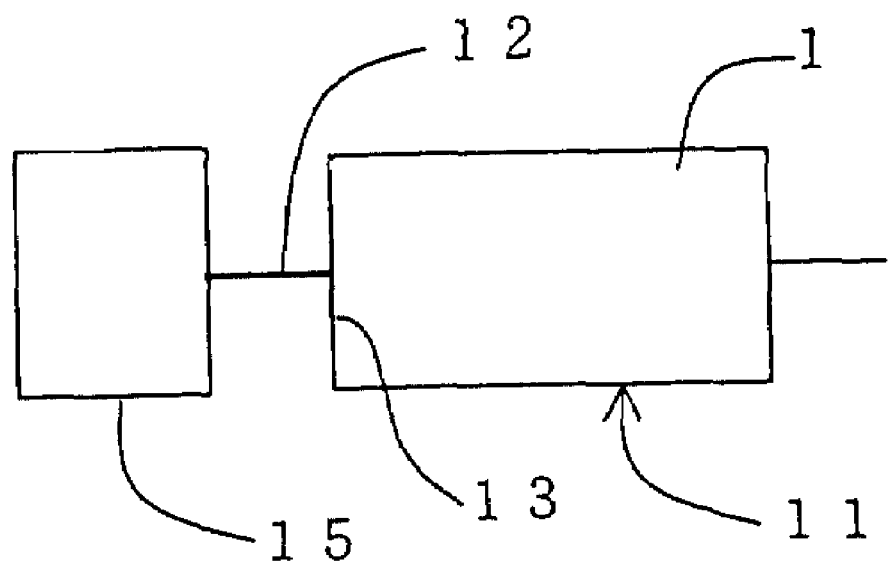
FIG. 8 is a schematic diagram showing one mode of a discharge fluid purification system according to a second aspect of the present invention.

Next, a concrete embodiment of the discharge fluid purification system of a second aspect will be described. As shown in FIG. 8, the purification system of the second aspect comprises: a purification section 11 for purifying a discharge fluid; and an introductory section 12 for introducing the discharge fluid discharged, for example, from an internal combustion engine 15 or the like into the purification section 11.

Moreover, the purification section 11 comprises the honeycomb structure 1 of the first aspect. The honeycomb structure is disposed in such a manner that the one-end surface having the height difference in the end portion is disposed on an upstream side 13 of the discharge fluid, that is, on an inlet side on which the discharge fluid flows in the honeycomb structure. This arrangement can effectively inhibit the blocking.

Figure 9:
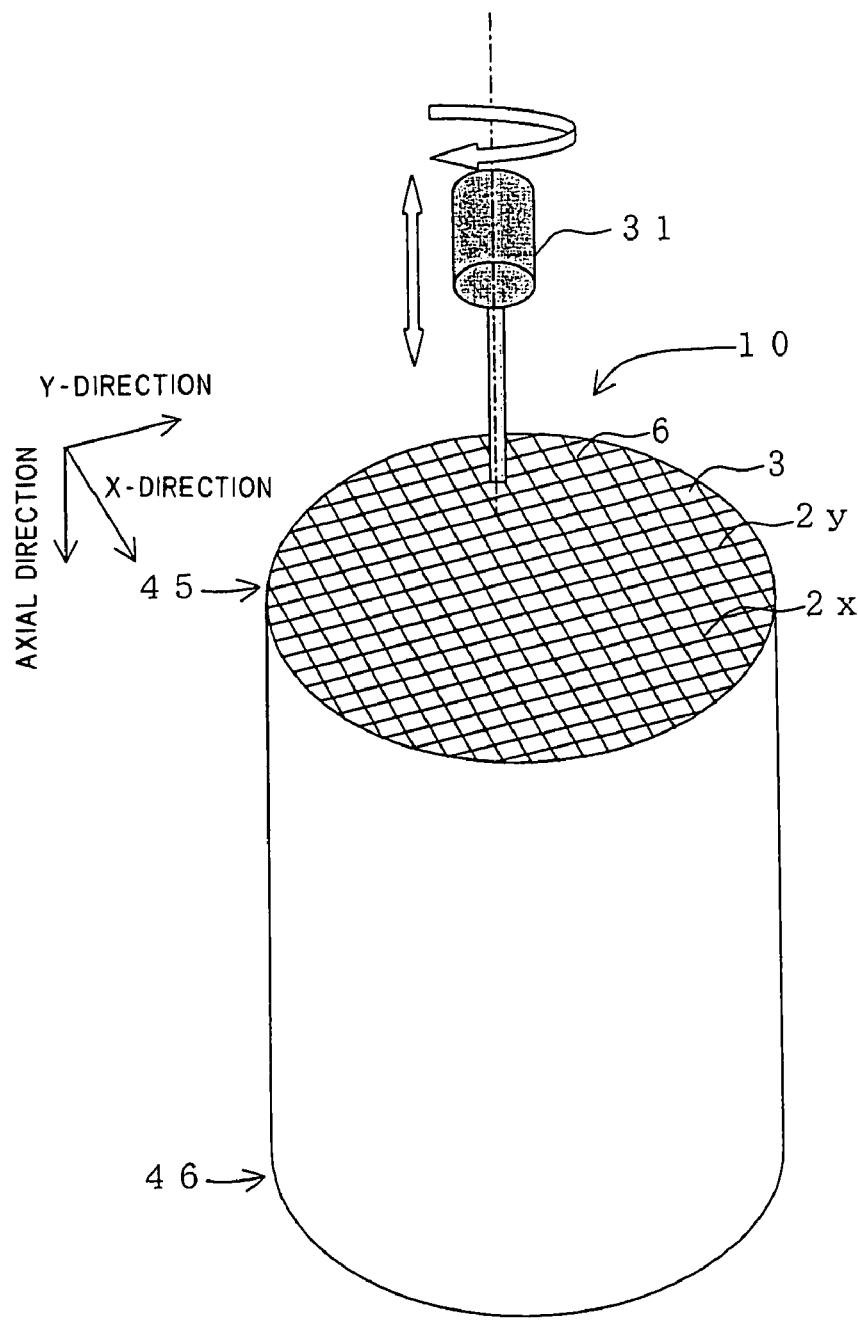
FIG. 9 is an explanatory view showing one mode of a method of manufacturing the honeycomb structure according to a third aspect of the present invention.

Next, a concrete embodiment of a manufacturing method of a third aspect will be described. As shown in FIG. 9, one preferable embodiment of the manufacturing method of the third aspect comprises: a step of processing/removing the predetermined intersecting portion 6 of the partition walls $2x$, $2y$ so as to make holes in an end surface 45 in the one-end surface 45 of the honeycomb body 10 comprising the partition walls $2x$ arranged in the X-direction so as to form a plurality of cells 3 extending to the other-end surface 46 from the one-end surface 45 through the axial direction, and the intersecting partition walls, for example, $2y$ arranged in the Y-direction. By this step, the honeycomb structure 1 of the first aspect shown in FIGS. 1, 2(a), (b) can be easily manufactured by a method in which mass production is possible.

There are not any special restrictions on a method of the cutting in this mode, but the intersecting portion may be ground or cut, for example, by a grinding grindstone or an end mill or a drill 31 so as to make holes in the intersecting portion. Furthermore, the end surface of the honeycomb structure is subjected to image processing, and the predetermined intersecting portion may be processed/removed to a predetermined depth, for example, in order to obtain a preferable axial-direction depth of the lack in the first aspect in accordance with obtained position information of the partition wall.

Figure 10B:
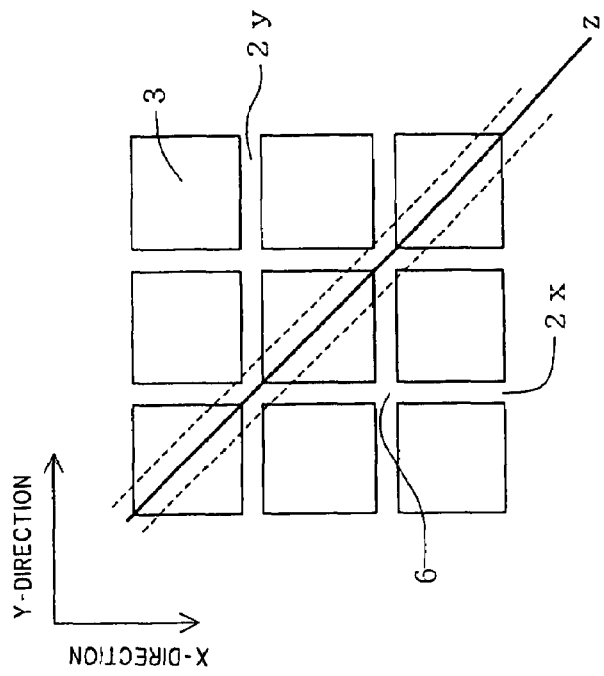
FIGS. 10(a), (b) are explanatory views showing another mode of the method of manufacturing the honeycomb structure according to the third aspect of the present invention.
Figure 10A:
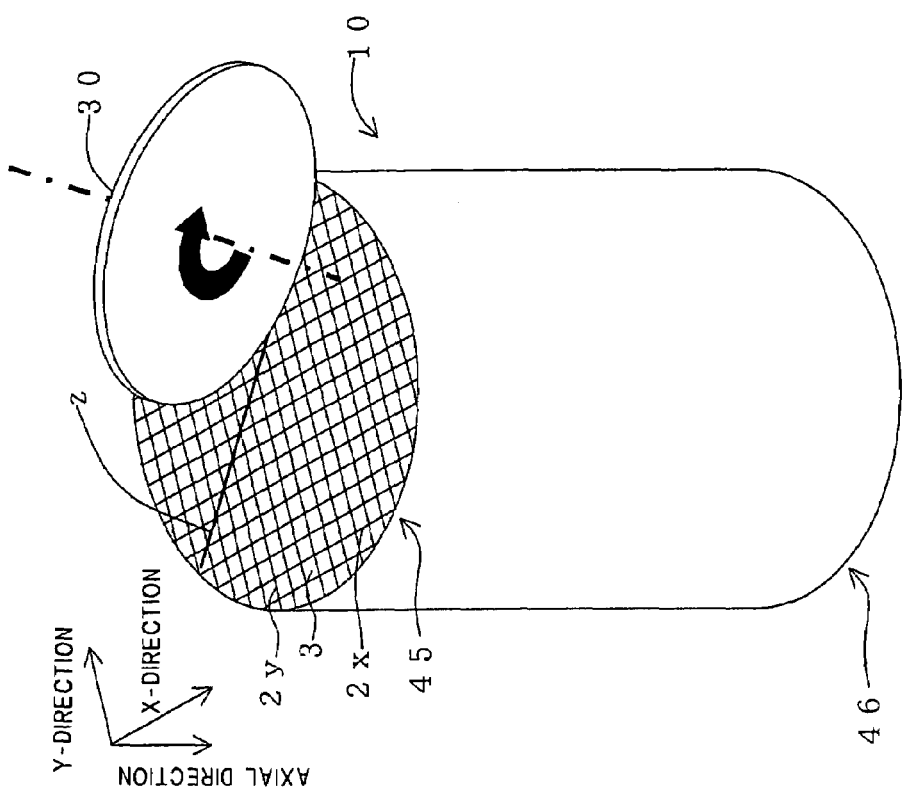
Figure 11:
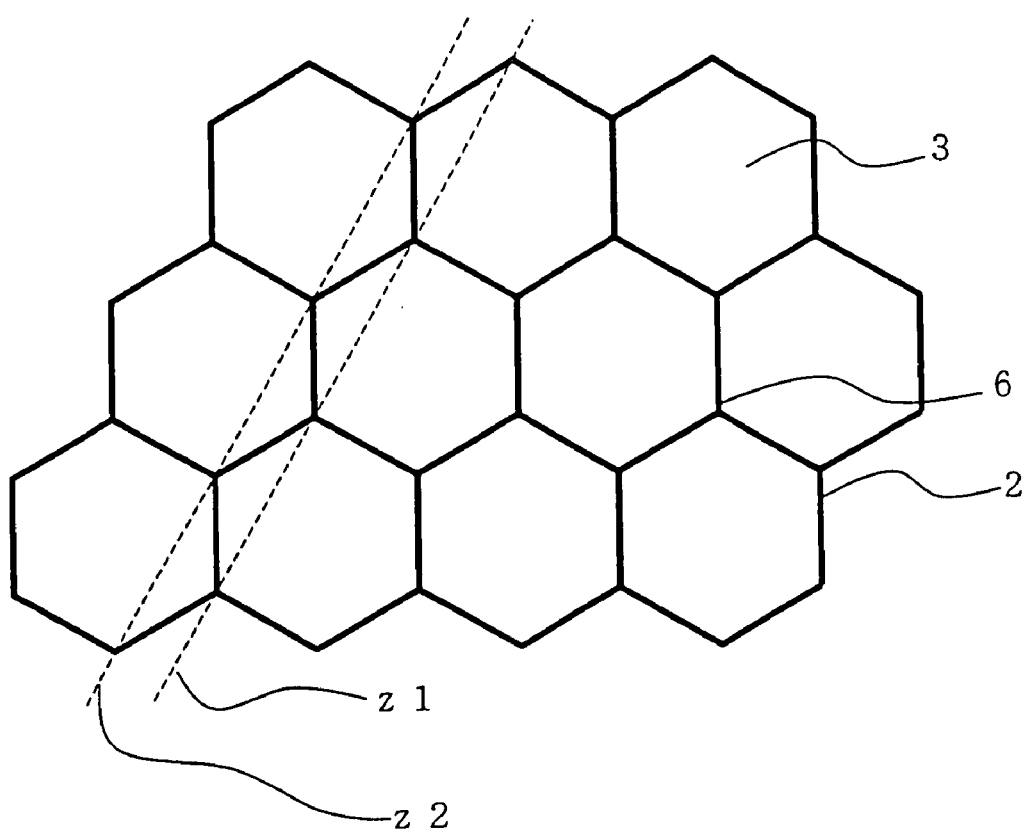
FIG. 11 is an explanatory view showing still another mode of the method of manufacturing the honeycomb structure according to the third aspect of the present invention.

Alternatively, as shown in FIGS. 10(a), (b), the end surface 45 may also be processed/removed so as to dig a groove along a line z connecting the intersecting portion 6 to another intersecting portion of the partition walls in the one-end surface 45. There are not any special restrictions on a method of the processing/removing in this mode, but, for example, a grindstone 30 may be rotated and moved along the line z so that the intersecting portions can be ground/processed/removed. Furthermore, the end portion of the honeycomb structure is subjected to image processing, and the intersecting portions 6 of the partition walls may be processed/removed to the predetermined depth, for example, so as to obtain the preferable axial-direction depth of the lack in the first aspect in accordance with the obtained position information of the partition wall. For the hexagonal cell, for example, as shown in FIG. 11, the surface may be processed/removed along a line z1 constituting the intersecting portion to the other intersecting portions. The portions may also be processed/removed along a line z2, and may also be processed/removed along the lines z1 and z2 together once.

In the third aspect, when the honeycomb structure including the plugging portions is manufactured, the honeycomb body 10 may also comprise the plugging portions, or a plugging step of constituting the open end portion of the cell may also be included. When the manufacturing method of the third aspect includes the plugging step, and when the processing/removing step is included after the plugging step, the plugging portions may also be processed/removed, and a honeycomb structure whose opening of the cell is broad and which is not easily blocked can be constituted.

Alternatively, the plugging step may also preferably performed after the processing/removing step. This can prevent plugging members from being excessively removed at a processing/removing time.

Moreover, the intersecting portions of the partition walls are preferably cut also in the other-end surface 46 in the same manner as described above. Accordingly, it is possible to form a honeycomb structure which is also superior in the resistance to the thermal shock also in the other-end surface and whose pressure loss is small.

In the third aspect, for the honeycomb body, for example, a powder of at least one material selected from the examples of the materials which are preferable main components in the first aspect is used as a raw material, and binders such as methyl cellulose and hydroxypropoxyl methyl cellulose are added to the material, and a surfactant and water are further added to form a plastic clay. This clay is used as a forming raw material, extruded to form a formed body having a honeycomb shape, dried, and thereafter fired to form a fired body so that the honeycomb body can be prepared. A pore former or dispersant may further be added to the clay. The pore former is not limited as long as the material has a property of being flied/scattered/eliminated by a firing step. Inorganic materials such as a carbon material, high polymer compounds such as a plastic material, organic materials such as starch and the like may also be used alone or as a combination of two or more of the materials.

For the plugging portions, the above-described powder raw material may be used as a slurry in the same manner as described above, charged into the predetermined cells of the formed or fired body, and then fired so that the portion can be formed. The fired body formed in this manner is also preferably subjected to the processing/removing step, and a non-fired formed body may also be subjected to the processing/removing step and thereafter to the firing step.

Moreover, as means for reducing the porosity of the plugging portion, there is a method in which a slurry component of a plugging agent is prepared and fired beforehand so as to set the porosity of the plugging portion to be smaller than that of a honeycomb structure main body. The surface of the protruding portion may also be coated with components such as cordierite, silica, and alumina. A Ti-based or W-based hard material may also be sprayed onto the protruding portion surface. When the surface of the protruding portion is coated in this manner, the porosity of the surface of the protruding portion can be reduced.

Next, a concrete embodiment of the manufacturing method of the fourth aspect will be described. The manufacturing method of the fourth aspect includes a forming step in which the forming raw material, for example, the plastic clay described, for example, in the third aspect is extruded to form a formed body of the honeycomb structure including, as shown in FIGS. 3(*a*), (*b*), the partition walls 2*x* arranged in the X-direction so as to form a plurality of cells 3 extending to the other-end portion 44 from the one-end portion 42 through the axial direction, and the intersecting partition walls 2*y* arranged, for example, in the Y-direction. For important characteristics in the fourth aspect, the formed body of the honeycomb structure is formed in the forming step so that at least some of the intersecting portions 6 of the partition walls 2*x*, 2*y* include the lacking portion 7 lacking to the other-end portion 44 from the one-end portion 42. When this forming step is included, it is possible to preferably manufacture the honeycomb structure of the first aspect without including the cutting step.

Figure 12:
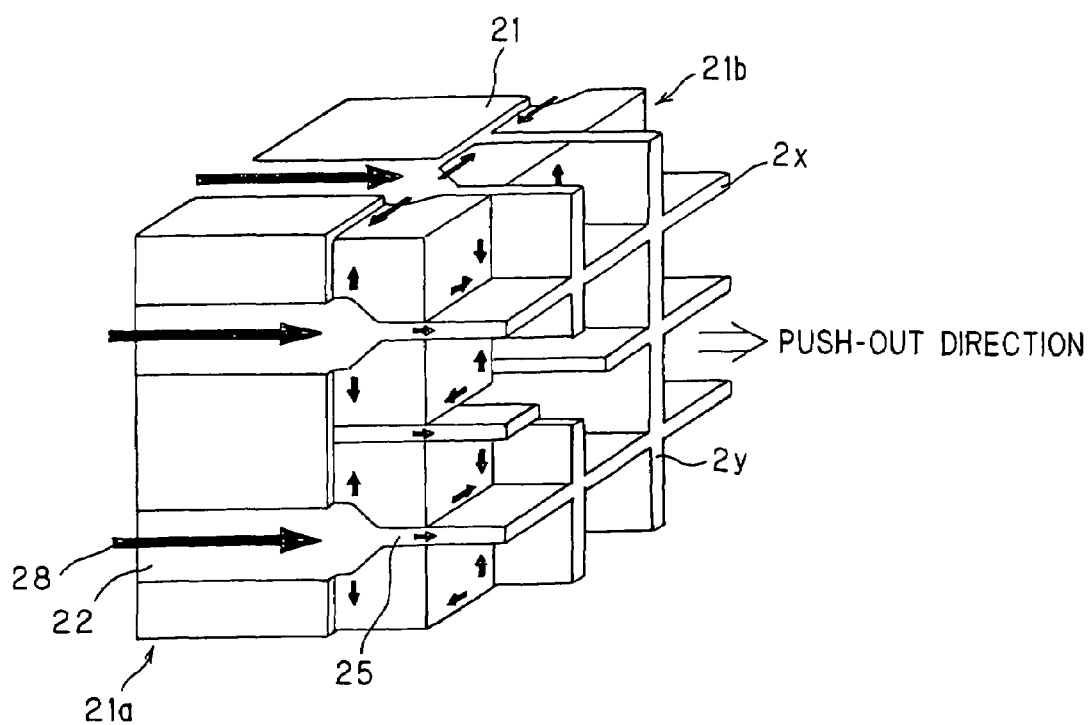
FIG. 12 is a schematic perspective view showing one example of a form for use in the method of manufacturing the honeycomb structure according to a fourth aspect of the present invention.
Figure 13A:
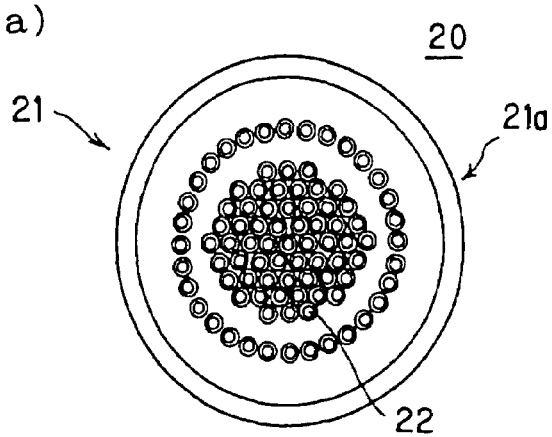
FIG. 13(a) to (d) shows a schematic diagram showing one example of a form for use in the method of manufacturing the honeycomb structure according to the fourth aspect of the present invention, FIG. 13(a), (b) are side views.
Figure 13B:
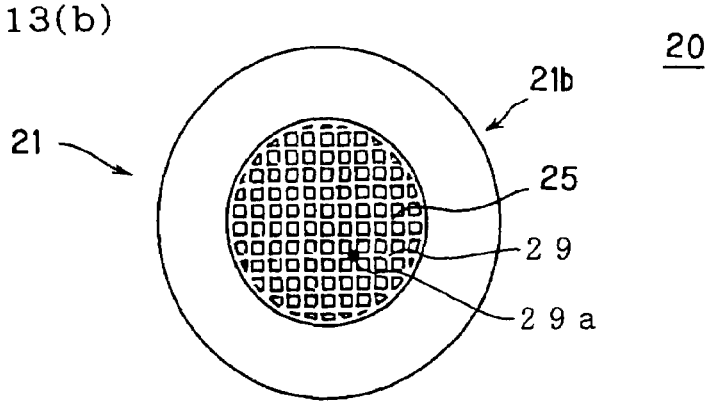
Figure 13C:
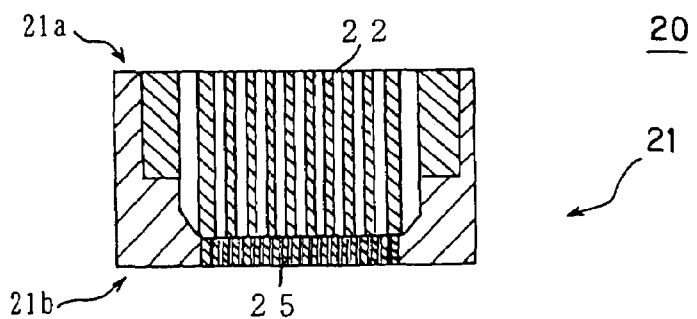
Figure 13D:
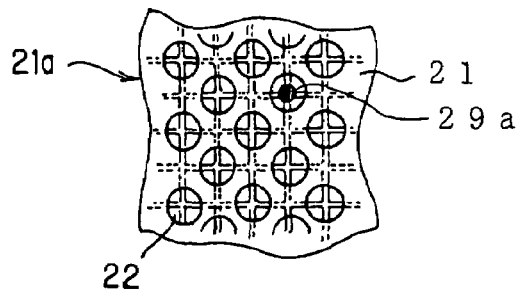

In the forming step of the fourth aspect, as shown in FIGS. 12 and 13(*a*) to (*d*), the material is preferably extruded by use of a die 20 including intersecting slits 25 forming the partition walls 2*x* arranged in the X-direction and the intersecting partition walls, for example, the partition walls 2*y* arranged in the Y-direction. At least some intersecting portions 29*a* of intersecting portions 29 of the intersecting slits 25 are blocked intersecting portions. By the use of this die, the lacking portion 7 can easily be formed.

As shown in FIGS. 12 and 13(*a*) to (*d*), the die 20 comprises a die base 21 including two surfaces, and the die base 21 comprises a raw material supply path 22 which is opened in one surface 21*a*, and slits 25 which communicate with the raw material supply path 22 and which are opened in the other surface 21*b*. Moreover, a forming raw material 28 introduced into the raw material supply path 22 from the surface 21*a* is formed into the shape of the partition wall while extruded from the slits 25 through the raw material supply path 22. Here, the slits 25 are arranged in the X and Y directions, and at least some 29*a* of the intersecting portions 29 are blocked. Therefore, the forming raw material cannot pass through the intersecting portions 29*a*, the portions form the lacking portions 7, and the formed body of the honeycomb structure including the lacking portions 7 can be obtained.

When the body is dried and fired as described above after the forming step, the honeycomb structure can be obtained. The plugging step may also be included as desired. Furthermore, the lacking portions are formed in the predetermined intersecting portions in the forming step, and further the lacking portions having predetermined depths are formed by the processing/removing step. This is also preferable for forming the honeycomb structure including the lacking portion lacking to the other-end portion from the one-end portion and the lacking portion having the predetermined depth.

Moreover, for the material constituting the die 20 shown in FIGS. 12 and 13(*a*) to (*d*), any material may also be used in addition to steel, alloy and the like, but, for example, an alloy tool steel (SKD 11 and the like) is preferable.

EXAMPLES

The present invention will be described hereinafter in more detail based on examples, but the present invention is not limited to these examples.

Example 1 and Comparative Example 1

First, a foaming resin was added as the pore former to silica, kaolin, talc, and alumina which were cordierite raw materials, further the binder, dispersant, and water were added, and the materials were kneaded to form a clay. The obtained clay was extruded by the use of the die in which the predetermined intersecting portions of the slits were blocked as shown in FIG. 12. Next, the obtained honeycomb formed body was dried by a combination of microwave or dielectric drying and hot air drying, and the dried honeycomb formed body was cut into predetermined shapes. A polyester film was attached to the end surface of the honeycomb formed body cut in the predetermined shape, and holes were made in the polyester film by an NC scannable laser device so that the cell in the end surface of the honeycomb formed body opens in a zigzag shape.

Thereafter, water, binder, glycerin were added separately to the cordierite raw material to prepare a slurry of about 200 dPa·S, the slurry was brought in a container for plugging, and the honeycomb formed body to which the film including holes made in a zigzag form was attached was pressed into this container for plugging. Accordingly, the cells of the honeycomb formed body were plugged in the zigzag form. Hot air at about 160° C. was applied to the plugged portions of the respective end surfaces of the honeycomb formed body obtained in this manner to dry the body for about five minutes.

Thereafter, the honeycomb formed body was fired to prepare the honeycomb body of Example 1.

For the obtained honeycomb body, a diameter of the end surface was about 229 mm, a length of a flow direction was about 150 mm, the cell had a square shape, and the partition wall thickness was about 0.4 mm. Moreover, a cell pitch was set to about 2.5 mm. This is commonly known as a cell structure 17 mil/100 cpsi. Here, 1 mil=1/1000 inch, 100 cpsi=100 cells/square inch. Moreover, approximately 100% of all the intersecting portions of the partition walls excluding the intersecting portions in the vicinity of an outer peripheral portion of the honeycomb structure are lacking. A plugging length in a cell passage inner direction from the end surface was about 10 mm on the one-end surface side, and about 3 mm on the other-end surface side. The porosity of the partition wall of the obtained honeycomb structure was measured by a mercury porosimeter as 67%, and an average pore diameter was 21 μm. The honeycomb structure of Comparative Example 1 was obtained in the same manner as in Example 1 except that a die in which the intersecting portions of the slits were not blocked was used.

Examples 2 and 3

The honeycomb structure of Comparative Example 1 was used as the honeycomb body. For the honeycomb body, all the intersecting portions of the partition walls in the one-end surface and the plugging portions in the vicinity were cut to a depth of 5.0 mm by the use of a drill having a diameter of about 1.5 mm to obtain the honeycomb structure of Example 2. For another honeycomb body having the same shape, the grindstone was rotated and fed along the line connecting the intersecting portion to the other intersecting portion of the partition walls to cut all the intersecting portions in the one-end surface, and the honeycomb structure of Example 3 was obtained. A grindstone width was 1.5 mm, a depth of the groove was 5.0 mm, and the tip of the grindstone was rounded by about R 1 mm. For the grindstone, a #200 electrodeposition diamond grindstone was used, and the processing was performed by an NC control plane grinding machine.

Figure 14:
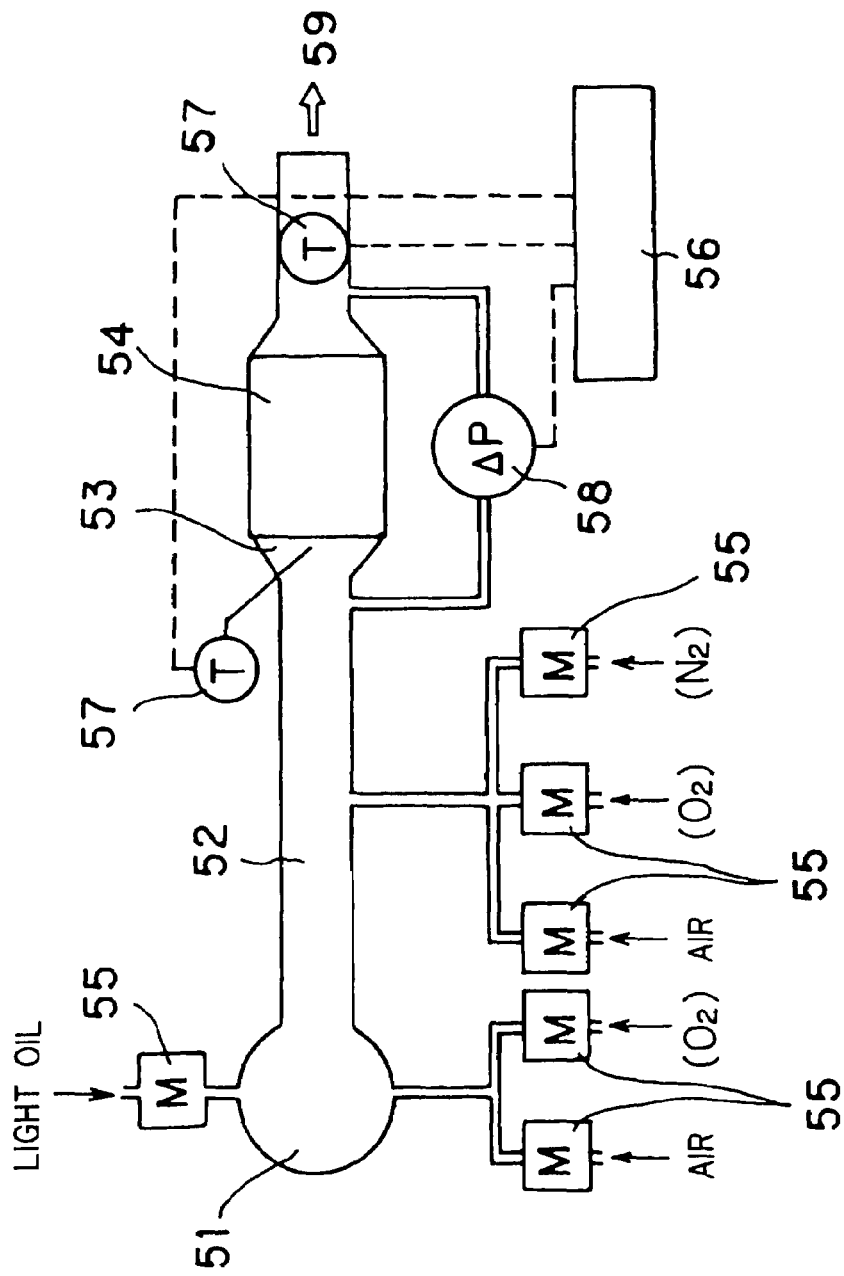
FIG. 14 is an outline constitution diagram of a soot generator for use in an embodiment of the present invention.

The obtained honeycomb structures (Examples 1 to 3 and Comparative Example 1) were subjected to a particulate material deposition test by the use of a soot generator, and the pressure losses of the honeycomb structures by the deposited particulate materials were measured. As shown in FIG. 14, a soot generator 50 includes: a combustion chamber 51 capable of generating a large amount of particulate materials by combustion of a light oil in the generator; a passage channel 52 through which combustion gas and particulate materials generated in the combustion chamber 51 pass; and a test chamber 53 which communicates with the passage channel 52 and in which a honeycomb structure 54 is disposed and which is capable of depositing a large amount of particulate materials in the honeycomb structure 54 in a short time.

Flow rate meters 55 are disposed in the combustion chamber 51 so that the fuel is supplied, and air or oxygen if necessary can be supplied. The passage channel 52 is provided with the flow rate meter 55 so that air or oxygen and nitrogen if necessary can be supplied. In the test chamber 53, a thermocouple 57 for temperature measurement, connected to a recorder 56, and a pressure gauge 58 for measuring an internal pressure of the test chamber 53 are disposed. The test chamber 53 is connected to an exhaust duct 59 from which a gas flowing through the honeycomb structure 54 from the passage channel 52 is discharged. The temperature of the test chamber 53 at the time of trapping the particulate material was at about 200° C., and an air flow rate was 9 Nm$^3$/min. In this case, a particulate material generated amount was 90 g per hour.

Figure 6C:
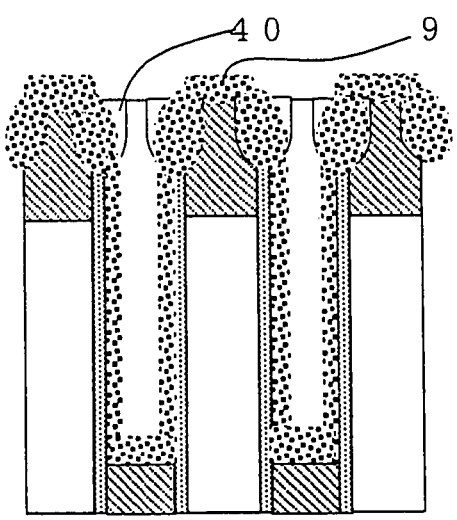

Deposited situations of the particulate materials in the end surfaces of the honeycomb structures of Examples 1 to 3 and Comparative Example 1 were confirmed. As shown in FIG. 6(b), in the honeycomb structure of Examples 1 to 3, the deposition/pool of the particulate material in the inlet of the cell proceeded, and the inlet of the cell was narrowed. For the honeycomb structures of Examples 1 to 3, since the opening area of the inlet of the cell was comparatively broad, the particulate materials entered the cell. Thereafter, even when the particulate materials were further deposited, as shown in FIG. 6(c), the inlet of the cell was not blocked, because the opening area of the inlet of the cell was broad. From this, the pressure loss did not rapidly increase in the honeycomb structure of the present example.

Moreover, as shown in FIG. 20(b), for the honeycomb structure of Comparative Example 1, the deposition/pool of the particulate material in the inlet of the cell proceeded, and the inlet of the cell was narrowed. Thereafter, when the particulate materials were further deposited, as shown in FIG. 20(c), the inlet portion of the cell was blocked, and the pressure loss rapidly rose. In an initial stage of the PM deposition, the pressure losses of Examples 1 to 3 were compared with the pressure loss of Comparative Example 1 in a state in which a difference did not appear in the PM deposited state, and as a result, the honeycomb structures of Examples 1, 2, and 3 indicated pressure losses lower than the pressure loss of the honeycomb structure of Comparative Example 1 by about 5 to 10%. Even when only the exhaust gas was passed without generating the PM, the similar result was obtained, and a reduction effect of an exhaust gas inflow resistance was confirmed in the plugging portion.

Example 4

The honeycomb structure was obtained in the same manner as in Example 2 except that the plugging depth of the other-end portion was set to 10 mm in the same manner as in the one-end portion and the intersecting portions in the other-end portion were processed/removed in the same manner as in the one-end portion in the honeycomb structure of Example 2, and evaluation was performed in the same manner as in Example 2. As a result, it has been confirmed that the pressure loss further drops as compared with Example 2.

Examples 5, 6 and Comparative Example 2

The honeycomb structure of Comparative Example 2 was obtained in the same manner as in Comparative Example 1. In the honeycomb structure, the diameter of the end surface was about 114 mm, the length of the flow direction was about 152 mm, the cell had the square shape, and the partition wall thickness was about 0.3 mm. Moreover, the cell pitch was set to about 1.5 mm. This is commonly known as a cell structure 12 mil/300 cpsi. The plugging length into the cell passage inner direction from the end surface was about 10 mm in any end surface.

The honeycomb structure of Comparative Example 2 was used as the honeycomb body, and one end surface of this honeycomb body, that is, the end surface on the inlet side of the fluid to be treated was processed/removed in a predetermined position of the end surface in such a manner that the grooves were formed in the same manner as in Example 2. The pressure loss of the filter was measured at a time when only the air was passed on a condition that any PM was not deposited (Example 5). The honeycomb structure used in Example 5 was disposed in such a manner that the inlet and outlet sides of the fluid to be treated were reversed, and the pressure loss was measured in the same manner as in Example 2 (Example 6). The pressure loss of the honeycomb structure of Comparative Example 2 was measured in the same manner as in Example 2. Results are shown in FIG. 15.

Figure 15:
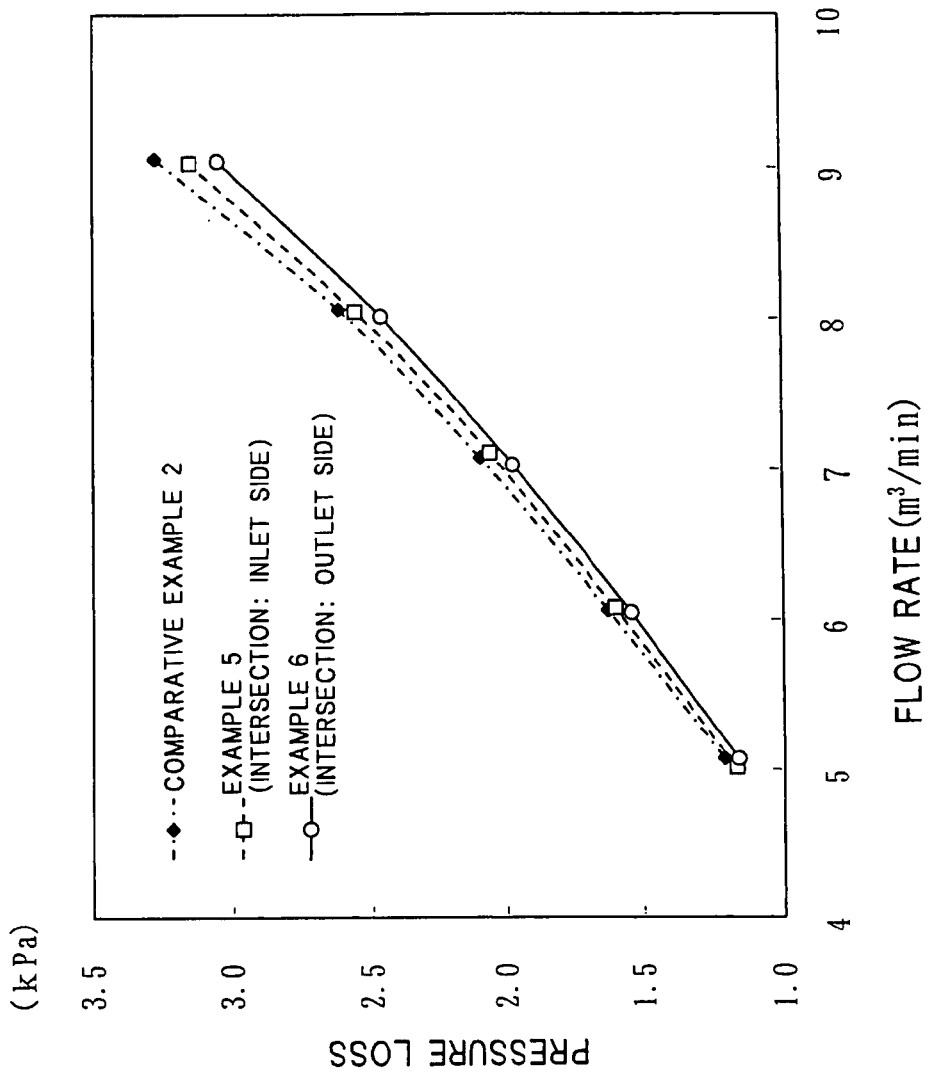
FIG. 15 is a graph showing a result of the embodiment.
Figure 16A:
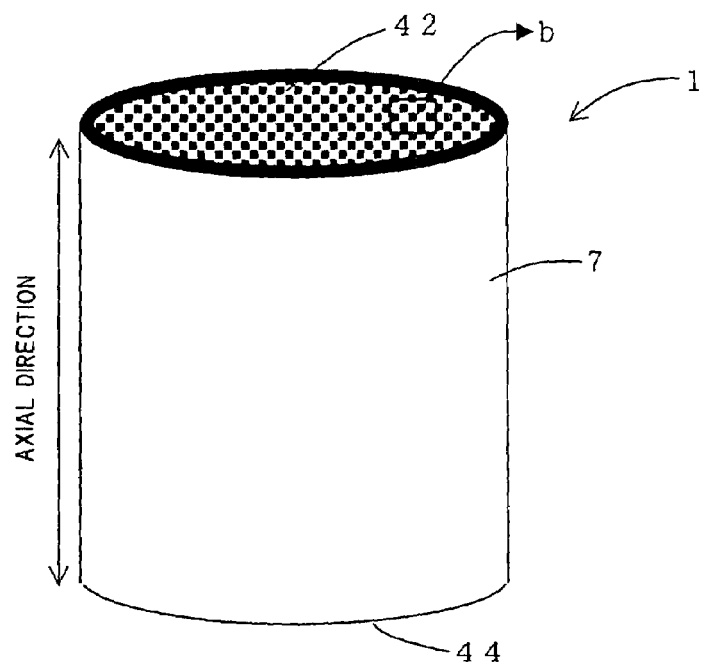
FIG. 16(a) is a schematic perspective view showing one example of a conventional honeycomb structure.
Figure 16B:
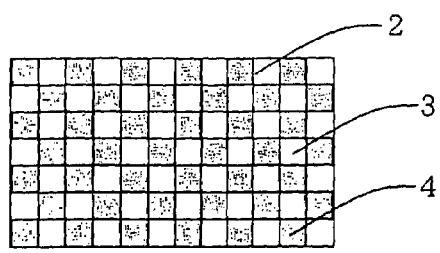
FIG. 16(b) is a plane partial enlarged view.
Figure 16C:
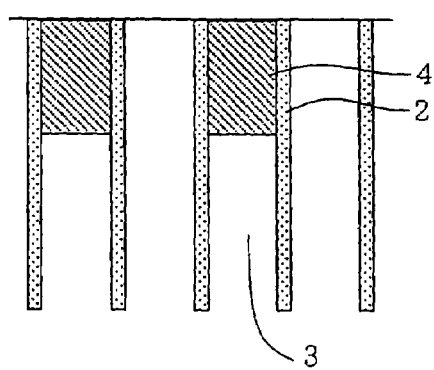
FIG. 16(c) is a section partial enlarged view.

From FIG. 15, it has been confirmed that the pressure losses of the samples of Examples 5, 6 drop as compared with the sample of Comparative Example 2. In Example 3, it has been confirmed that the pressure loss further drops.

As described above, for a honeycomb structure of a first aspect of the present invention, and a discharge fluid purification system of a second aspect in which the honeycomb structure is used, during use an opening is inhibited from being blocked, and a pressure loss is inhibited from increasing. Therefore, the structure and system are preferably usable, for example, for trapping particulates in an exhaust gas of an internal combustion engine, boiler or the like or as a filter for filtering liquids such as city water and sewage and as a purification system. Moreover, methods of manufacturing the honeycomb structures of the third and fourth aspects are preferably usable as methods of manufacturing the honeycomb structures because the honeycomb structures of the first and second aspects can easily be manufactured and mass production is possible.

What is claimed is:

1. A honeycomb structure, comprising:
   first and second end portions located at two opposite ends along an axial direction of the honeycomb structure;
   X partition walls arranged in an X-direction that form a plurality of cells, the cells extending from the first end portion to the second end portion along the axial direction, the X-direction being substantially perpendicular to the axial direction, the cells having a cell pitch in the X-direction; and
   Y partition walls arranged in a Y-direction intersecting the X partition walls, the Y-direction being substantially perpendicular to the axial direction and at an angle from the X-direction, wherein:
   intersecting portions of the X and Y partition walls include a lacking intersecting portion in at least one of the first and second end portions;
   the lacking intersecting portion is configured by a part of an intersecting portion of the X and Y partition walls that is lacking, wherein the lacking intersecting portion includes a single intersection of the X-direction partition wall and the Y-direction partition wall; and
   the lacking intersecting portion sustains a width in a direction that is perpendicular to the axial direction, the width decreasing along the axial direction from an end surface of the one of the first and second end portions towards an interior of the one of the first and second end portions.

2. The honeycomb structure according to claim 1, wherein:
   the lacking intersecting portion sustains a depth that extends along the axial direction from the end surface into the interior of the one of the first and second end portions; and
   the depth is 10% or more of the cell pitch.

3. The honeycomb structure according to claim 1, wherein the intersecting portions of the X and Y partition walls include a lacking intersecting portion in the other of the first and second end portions.

4. The honeycomb structure according to claim 1, wherein the lacking intersecting portion extends from the one of the first and second end portions to the other of the first and second end portions.

5. The honeycomb structure according to claim 1, further comprising:
   plugging portions for plugging open end portions of predetermined cells among the plurality of cells in the first and second end portions, wherein the lacking intersecting portion is adjacent to a first plugging portion of the plugging portions, and the first plugging portion has a width that decreases in the axial direction from the interior of the one of the first and second end portions toward the end surface due to a shape of the lacking intersecting portion.

6. The honeycomb structure according to claim 5, wherein a number of the plugging portions, together with surrounding intersecting portions thereof, are lacking.

7. The honeycomb structure according to claim 5, wherein intersecting portions around the first plugging portion are lacking in the axial-direction by a depth that is smaller than that of the first plugging portion.

8. The honeycomb structure according to claim 5, wherein intersecting portions around the first plugging portion are lacking in the axial-direction by a depth that is larger than that of the first plugging portion.

9. The honeycomb structure according to claim 5, wherein a catalyst component is carried on a surface of the plugging portion.

10. The honeycomb structure according to claim 1, wherein the X and Y partition walls comprise pores and are porous, and surfaces of the X and Y partition walls and/or pore surfaces inside the X and Y partition walls carry a catalyst component.

11. The honeycomb structure according to claim 1, wherein the lacking intersecting portion sustains a tapered shape.

12. A discharge fluid purification system, comprising:
   a purification section for purifying a discharge fluid; and
   an introductory section for introducing the discharge fluid into the purification section,
   wherein the purification section comprises a honeycomb structure, the honeycomb structure comprising:
      first and second end portions located at two opposite ends along an axial direction of the honeycomb structure;
      X partition walls arranged in an X-direction that form a plurality of cells, the cells extending from the first end portion to the second end portion along the axial direction, the X-direction being substantially perpendicular to the axial direction, the cells having a cell pitch in the X-direction; and
      Y partition walls arranged in a Y-direction intersecting the X partition walls, the Y-direction being substantially perpendicular to the axial direction and at an angle from the X-direction; and
   wherein:
      intersecting portions of the X and Y partition walls include a lacking intersecting portion in at least one of the first and second end portions;
      the lacking intersecting portion is configured by a part of an intersecting portion of the X and Y partition walls that is lacking, wherein the lacking intersecting portion includes a single intersection of the X-direction partition wall and the Y-direction partition wall;
   the lacking intersecting portion sustains a width in a direction that is perpendicular to the axial direction, the width decreasing from the end surface along the axial direction into the interior of the one of the first and second end portions; and
   the one of the first and second end portions of the honeycomb structure is disposed on an upstream side.

* * * * *